(12) United States Patent  (10) Patent No.: US 8,816,613 B2
Lee  (45) Date of Patent: Aug. 26, 2014

(54) RECONFIGURABLE BATTERY

(76) Inventor: Chong Uk Lee, San Diego, CA (US)

( * ) Notice: Subject to any disclaimer, the term of this patent is extended or adjusted under 35 U.S.C. 154(b) by 382 days.

(21) Appl. No.: 13/368,421

(22) Filed: Feb. 8, 2012

(65) Prior Publication Data

US 2012/0133310 A1 May 31, 2012

Related U.S. Application Data

(63) Continuation-in-part of application No. 12/459,531, filed on Jul. 2, 2009, now abandoned.

(51) Int. Cl.
*H02P 7/00* (2006.01)

(52) U.S. Cl.
USPC ............................. 318/140; 320/116

(58) Field of Classification Search
USPC .................... 318/140; 320/116, 117
See application file for complete search history.

(56) References Cited

U.S. PATENT DOCUMENTS

| | | | |
|---|---|---|---|
| 3,923,116 A | 12/1975 | Thomspon et al. | |
| 4,142,135 A | 2/1979 | Fujita | |
| 4,313,080 A | 1/1982 | Park | |
| 4,894,764 A | 1/1990 | Meyer et al. | |
| 4,916,329 A | 4/1990 | Dang et al. | |
| 5,341,075 A | 8/1994 | Cocconi | |
| 5,773,962 A | 6/1998 | Nor | |
| 5,965,996 A * | 10/1999 | Arledge et al. | 320/116 |
| 6,047,787 A | 4/2000 | Deng et al. | |
| 6,104,165 A | 8/2000 | Miyamoto et al. | |
| 6,230,496 B1 | 5/2001 | Hofmann et al. | |
| 6,255,826 B1 * | 7/2001 | Ohsawa et al. | 324/426 |
| 6,430,692 B1 | 8/2002 | Kimble et al. | |
| 6,441,581 B1 | 8/2002 | King et al. | |
| 6,462,510 B1 * | 10/2002 | Takada et al. | 320/116 |
| 6,627,345 B1 | 9/2003 | Zemlok et al. | |
| 6,646,442 B2 * | 11/2003 | Katoh | 324/433 |
| 6,882,129 B2 * | 4/2005 | Boskovitch et al. | 320/119 |
| 6,909,959 B2 | 6/2005 | Hallowell | |
| 6,977,482 B2 | 12/2005 | Popescu-Stanesti et al. | |
| 7,005,830 B2 | 2/2006 | Moore et al. | |
| 7,075,194 B2 | 7/2006 | Weidenheimer et al. | |
| 7,138,775 B2 * | 11/2006 | Sugimoto et al. | 318/140 |

(Continued)

FOREIGN PATENT DOCUMENTS

WO 00/32917 6/2000
WO 2011/108925 9/2011

OTHER PUBLICATIONS

International Search Report for PCT/US2013/021877 dated Apr. 8, 2013.

*Primary Examiner* — Rina Duda
(74) *Attorney, Agent, or Firm* — Lipsitz & McAllister, LLC

(57) ABSTRACT

A reconfigurable battery has at least one bank of statically joined series connected battery cells, each cell including a positive and a negative pole. The poles connect through switches to respective output connections. Activating a set of processor controlled switches reconfigures at least some of the battery cells into a configuration to provide a voltage across the output connections. The output battery voltage may vary intermediately between zero volts and the maximum voltage produced by the series connected battery cells. An alternative configuration of switches divides groups of series connected battery cells into separate battery banks that permit other battery cell configurations. Duty cycle modulation of the switches allows intermediate control of output voltage with reduced switching transients. Reconfigurable battery cells used in combination with an electric motor permit selectable speed control and battery regeneration schemes matched to motor output.

36 Claims, 22 Drawing Sheets

Driving mode (series cells)

(56) References Cited

U.S. PATENT DOCUMENTS

| | | |
|---|---|---|
| 7,208,894 B1 | 4/2007 | Earle |
| 7,242,159 B2 | 7/2007 | Ishikawa et al. |
| 7,456,521 B2 * | 11/2008 | Weidenheimer et al. ....... 307/71 |
| 7,893,561 B2 * | 2/2011 | Weidenheimer et al. ....... 307/71 |
| 2001/0035696 A1 | 11/2001 | Knowles et al. |
| 2003/0071523 A1 | 4/2003 | Silverman |
| 2005/0206331 A1 | 9/2005 | Donnelly |
| 2006/0076171 A1 | 4/2006 | Donnelly et al. |
| 2007/0052295 A1 | 3/2007 | Frucht |
| 2007/0062744 A1 | 3/2007 | Weidenheimer et al. |
| 2007/0080662 A1 | 4/2007 | Wu |
| 2009/0160247 A1 | 6/2009 | Nakamura et al. |
| 2011/0018352 A1 | 1/2011 | Lai |
| 2013/0049677 A1 | 2/2013 | Bouman |

* cited by examiner $V_{out} > V_{in}$ (for the inverter)
$V_{out} > V_B$ to charge the battery

*Figure 5a* : Driving mode (series cells)
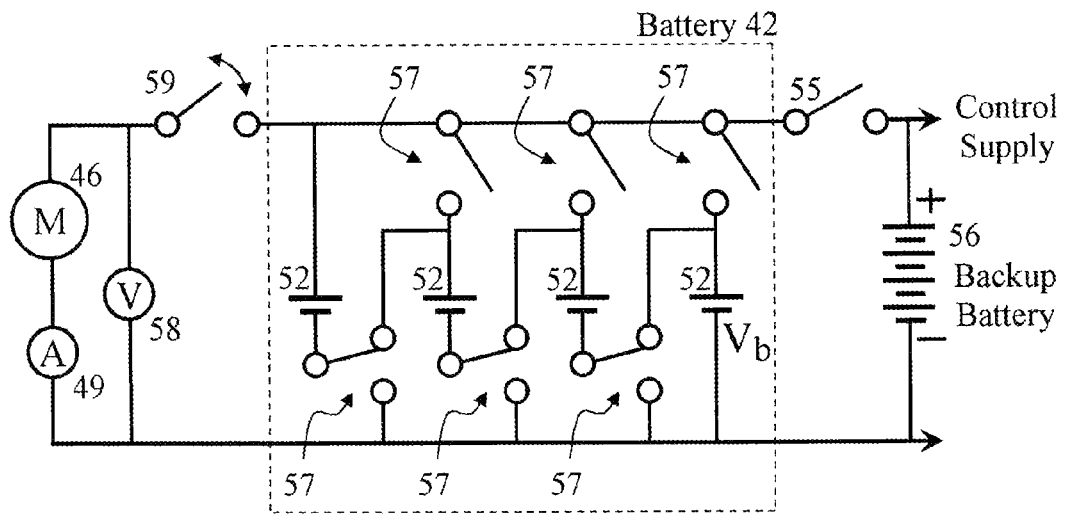
*Figure 5b* : Regenerative mode (parallel cells)
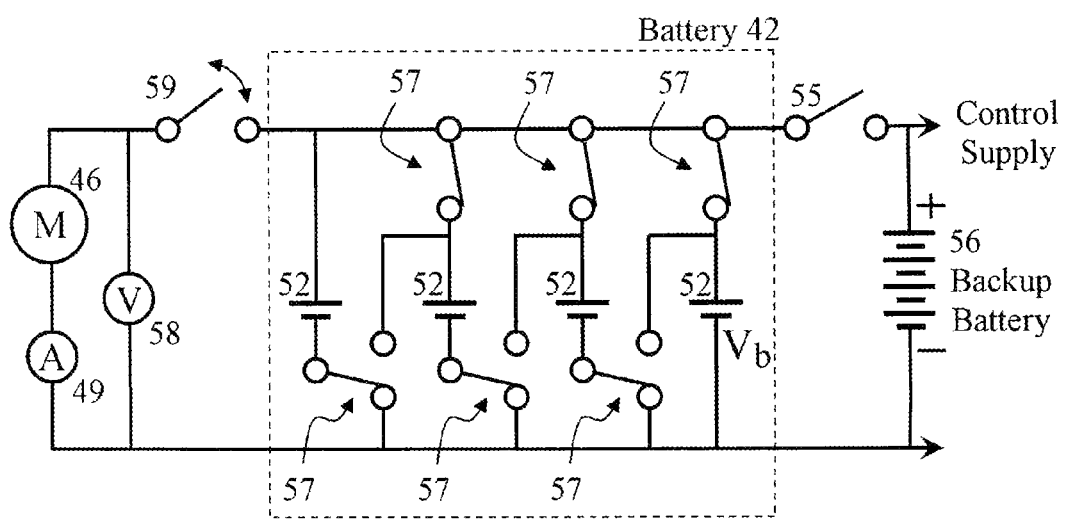

*Figure 5c* : Example of Intermediate Voltage
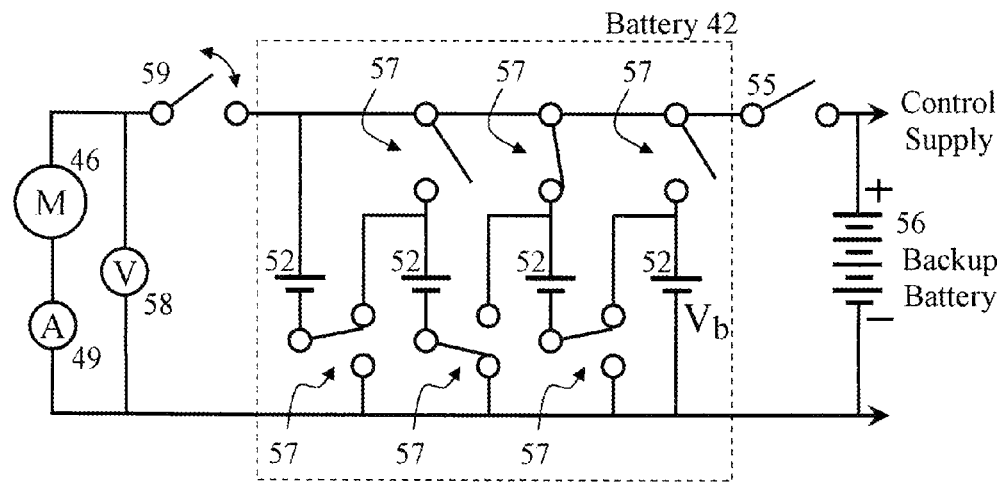
*Figure 6*
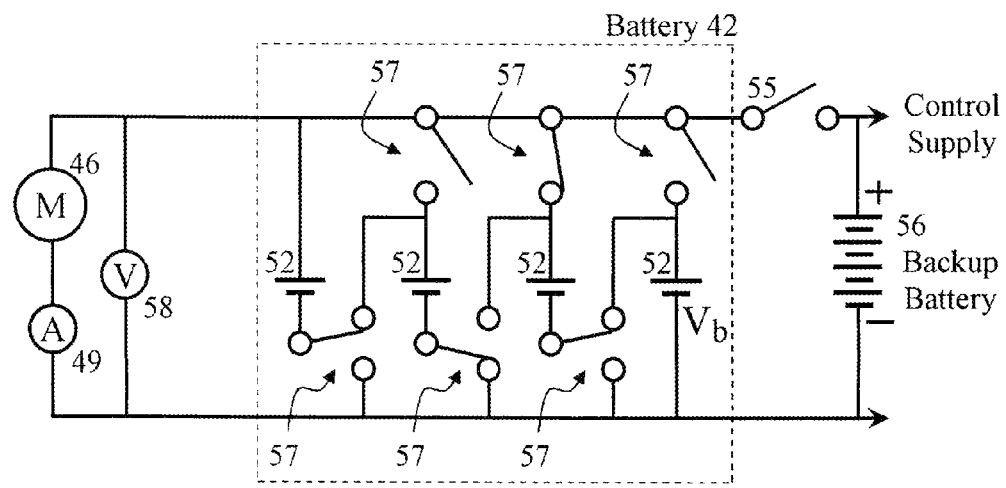

*Figure 7a* : Parallel motors
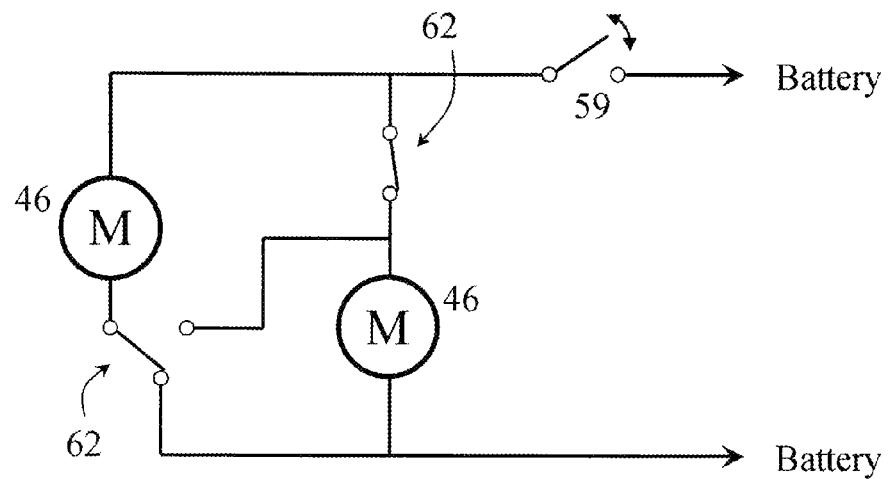
*Figure 7b* : Serial motors
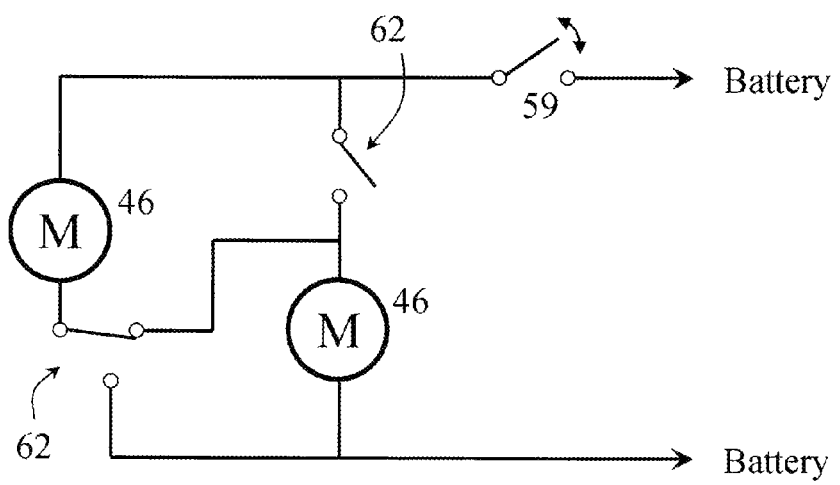

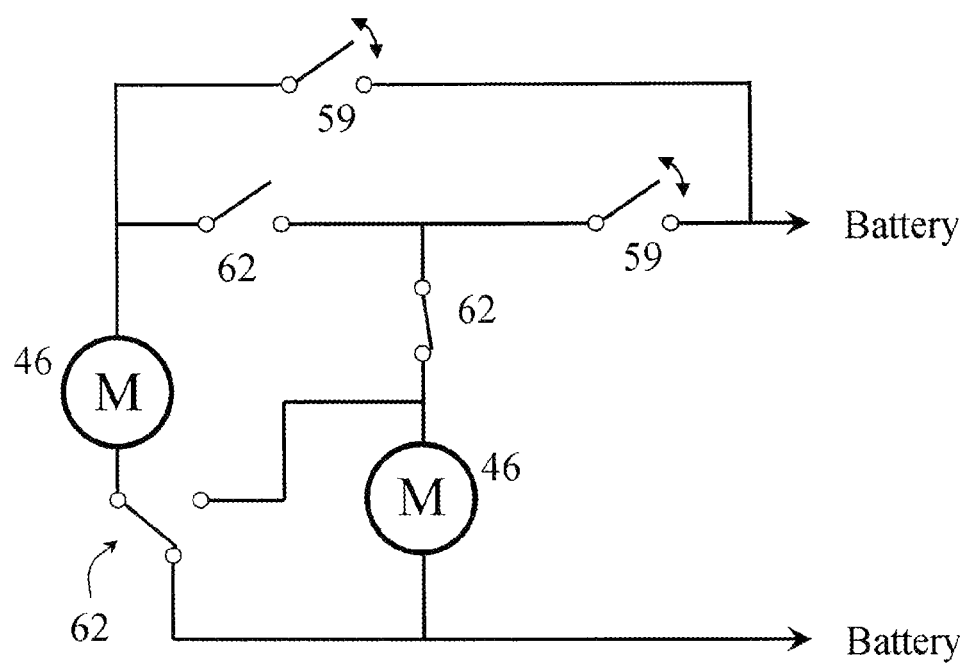
*Figure 8* : Variable driving / braking between motors

RECONFIGURABLE BATTERY

This application is a continuation-in-part of commonly owned, co-pending U.S. patent application Ser. No. 12/459,531, filed on Jul. 2, 2009, the entire contents of which is incorporated herein by reference.

BACKGROUND OF THE INVENTION

The present invention relates to the field of electric batteries designed for use with electric motors which are rechargeable using regenerative charging, such as batteries for electric bicycles. More specifically, the present invention relates to a reconfigurable battery, reconfigurable electric motors for use with such a reconfigurable battery, methods for reconfiguring a battery for driving variable electrical loads, and methods for reconfiguring a battery for charging and for reconfiguring electric motors for charging a battery.

The present invention is described in connection with electric bicycles where a rechargeable battery drives an electric motor. In prior art electric bicycles, in some instances the current from the battery is regulated by a speed controller that controls the motor which provides assistance to the rider. In other instances, where the rider wants to slow down or brake going downhill, the motor acts as a generator and supplies the current back to the battery, thereby achieving regenerative braking that recovers part of the energy that would otherwise be lost when using a mechanical brake alone.

An electric motor typically uses a set of magnets, for example, electro magnets and permanent magnets. As the motor turns, the attractive and repulsive forces of these magnets are regulated electrically such that the motor turns continuously in the desired direction. This could be done by electro-mechanical switches (e.g. commutators), or could be done by solid state switches (e.g. FETs—Field Effects Transistors). FIG. 1 shows an example of a motor 12 connected to a battery 10. As the current $I_m$ flows into the motor 12 and the motor turns, the motor generates a back EMF (Electro Motive Force) which is a voltage roughly proportional to the speed of the motor 12. The current $I_m$ is defined as $(V_B-V_M)/(R_M+R_B)$ where $R_M$ is the internal resistance of the motor 12 and $R_B$ is the internal resistance of the battery. Given a fixed applied voltage $V_B$ (e.g. from the battery 10) the back EMF reduces the amount of current that flows into the motor 12, because the current flow is proportional to the difference between the motor voltage $V_M$ (back EMF) and the battery voltage $V_B$. For example, if the motor 12 is turning (with some outside assistance) at a rate such that the back EMF equals the battery voltage $V_B$, than there will be no current flow. If the motor 12 turns faster than this such that the back EMF is higher than the battery voltage $V_B$, then the current flows the other way, thereby recharging the battery 10. One extreme case is a stall, when the motor 12 is at rest. In such a case, the back EMF is zero since the motor is at rest, the current flow from the battery 10 will be at its maximum, and the motor 12 will produce its highest torque.

When the bicycle is moving and the motor 12 produces a finite back EMF, the motor 12 can be used as a generator to recharge the battery 10, while achieving a desired level of braking. In order to achieve this, the voltage out of the motor 12 is increased to a level higher than the battery 10 using a device known as an inverter.

A block diagram of a typical prior art electric bicycle system without regenerative braking is shown in FIG. 2. A battery 10 provides current to a motor 12 though a speed controller 11. The speed controller 11 governs the current flow to the motor 12, thereby controlling its speed. The speed controller 11 may be set to a desired speed by a rider using a control knob 13.

A block diagram of a further prior art electric bicycle system that provides regenerative braking is shown in FIG. 3. FIG. 3 is similar to FIG. 2 but also includes an inverter 14 in parallel with the controller 11. A switch 15 is provided for coupling the motor 12 to the controller 11 (in a drive mode) or the inverter 14 (in a braking mode). During the braking mode, current is generated by the motor 12 and passed to the battery 10 by the inverter 14, in order to charge the battery.

It should be noted that a practical system involves two distinct operations, one that drives the motor and the bicycle wheel(s) by supplying current from the battery to the motor (s), and another that uses the current from the motor(s) to charge the battery to achieve regenerative braking, thereby slowing down the bicycle. It should be further apparent from FIG. 3 that in order to recharge the battery, one needs an inverter that increases the voltage from the motor to a value higher than the battery voltage, in order for the current to flow back into the battery.

For a typical rechargeable battery, the charging voltage must be higher than the battery voltage. The higher the charging voltage relative to the battery voltage, the more current flows into the battery. Controlling the charging voltage is one of the ways to control the rate of recharging, as well as the rate of braking. Another way to control the recharging rate is pulse width modulation (PWM), where a switch between the charging source and the battery regulates an on-off duty cycle. Of course, the charging voltage still needs to be higher than the battery voltage for such a device to work.

In most electric vehicles such as electric bicycles and electric cars that utilize regenerative braking, the electrical system typically consists of several subsystems, namely a motor, a speed controller, an inverter, and a battery. Sometimes the speed controller regulates both the drive and braking current via PWM. Potentially, a clever inverter design could regulate both driving and braking by regulating the voltage to the motor for driving, and regulating the voltage to the battery for regenerative braking, thereby eliminating the need for a separate speed controller.

However, an inverter is not an easy device to design or cheaply produce, as it must handle a large amount of current (especially during quick braking) and sometimes a high output voltage, while its input voltage can fluctuate over a wide range. The input voltage in this case is the back EMF from the motor, typically close to zero when the bicycle is coming to a stop, and close to the maximum battery voltage when the bicycle is coasting on a level ground at its maximum speed (usually the battery voltage limits the top speed).

Also an inverter typically achieves its functionality using rapid switching devices. One inverter design could turn the DC current from the motor to AC current first, increase the voltage using a step-up transformer, and convert the AC current back to DC in order to recharge the battery. Another inverter design could use temporary energy storage elements such as capacitors and inductors in a charge-pump configuration in order to raise the voltage. The switching frequency involved is typically in the order of 1-100 KHz. In most of the known inverter designs, the energy loss is significant, and the cost is very high due to the high current requirement (100 Amps or more) in addition to the weight. For this reason, only a small percentage of electric bicycle products incorporate regenerative braking in their design.

It would be advantageous to provide a battery and/or electric motor configuration that provides driving and regenerative braking, for example in an electric bicycle, over a reasonable range of operations without the need for an inverter.

It would also be useful to provide a reconfigurable battery and battery control system that provides duty cycle modulation of an array of battery cells for intermediate output voltage control without incurring large switching losses, while simultaneously reducing switching induced transient signals.

The methods and apparatus of the present invention provide a series connected reconfigurable battery having these and other advantages.

SUMMARY OF THE INVENTION

The present invention relates to reconfigurable batteries, e.g., for use in the drive systems of electric vehicles such as bicycles, automobiles, trucks, locomotives, utility carts, and the like. In particular, the present invention relates to a reconfigurable battery with a plurality of series connected battery cells and reconfigurable electric motors for use with such a reconfigurable battery in an electric vehicle drive system, and methods for reconfiguring a battery for charging and discharging through variable electrical loads.

In accordance with the invention, a reconfigurable battery is disclosed having at least one bank of batteries made from a statically joined plurality of series connected battery cells. Each battery cell has a first voltage pole and a second voltage pole. At least one processor controlled switch electrically connects between the first voltage pole of each battery cell and a first electrical output connection. At least one processor controlled switch electrically connects between the second voltage pole of each battery cell and a second electrical output connection. The processor controlled switches are adapted to electrically reconfigure the battery cells by coupling a first voltage pole of a battery cell to the first electrical output connection and a second voltage pole of a battery cell to the second electrical output connection to provide a reconfigurable battery output voltage between the first and second electrical output connections.

The reconfigurable battery output voltage is approximately equal to the voltage summation of the electrically reconfigured battery cells, and is in a range between zero volts and a maximum absolute output voltage (e.g., positive or negative) for the statically joined plurality of series connected battery cells.

In another example embodiment, the reconfigurable battery further includes at least one switching means electrically connected between the first voltage pole of a beginning battery cell in the statically joined plurality of series connected battery cells and the second electrical output connection.

The reconfigurable battery can also include at least one switch electrically connected between the second voltage pole of an end battery cell in the statically joined plurality of series connected battery cells and the first electrical output connection.

In another example embodiment, the reconfigurable battery further includes a plurality of banks connected in a parallel configuration.

In another example embodiment, the reconfigurable battery includes a series joining of a first bank of battery cells to a second bank of battery cells. A first intermediate processor controlled switch is connected between a second voltage pole of an end positioned battery cell in a first bank and a first voltage pole of a beginning positioned battery cell in a second bank. A second intermediate processor controlled switch is connected between a first voltage pole of a beginning positioned battery cell in a first bank and a second voltage pole of an end positioned battery cell in a second bank. The first electrical output connection of the first bank is connected to the first electrical output connection of the second bank, and the second electrical output connection of the first bank is connected to the second electrical output connection of the second bank. In operation, the first intermediate processor controlled switch and the second intermediate processor controlled switch cannot simultaneously be in a closed state.

In addition, in the reconfigurable battery of the preceding example embodiment, the second bank of statically joined plurality of series connected battery cells may be substituted by a single battery cell.

In another example embodiment, the reconfigurable battery of the preceding example embodiments can further include a capacitive element and/or an inductive element for voltage and/or current waveform filtering.

Any of the preceding example embodiments can include a voltage monitoring means and a current monitoring means, where the voltage monitoring means is a voltmeter connected across the first electrical output connection and the second electrical output connection. Alternatively, the current monitoring means is an ammeter either connected in series with the first electrical output connection or the second electrical output connection. Yet another alternative is that the voltage and current monitoring means may be part of a battery condition control system. Still further, temperature monitoring of the battery cells can be provided for use in charge and discharge control, as well as for diagnosing failing or failed cells.

The battery condition control system includes at least one electronic processor, at least one data storage device, at least one communication channel, at least one reconfigurable battery control protocol, and a user interface protocol to allow communication and control by a user.

In the example embodiments, the switches and the intermediate switches can include power MOSFET and/or other solid state (e.g., semiconductor) switches with, e.g., Pulse Width Modulation or Pulse Density Modulation control circuitry. Mechanical switches could also be used alone or in combination with other solid state switches. In addition, the first voltage pole can be set to a higher voltage potential than the second voltage pole.

In an example embodiment, the battery provides energy for an electrical load, where the electrical load can be a vehicle with at least one electrical motor. The vehicle is one of an electric bicycle, an electric scooter, an electric vehicle, a hybrid automobile, a hybrid truck, an electric powered wheelchair, and an electric powered golf cart.

In another example embodiment, the reconfigurable battery is charged by connecting at least one power source to the battery. The power source can be, for example, a vehicle electrical system adapted for regenerative charging, or a rectified (or direct) AC power source.

In an example embodiment, a method for reconfiguring a battery includes the steps of arranging a portion of a statically joined plurality of series connected battery cells into a first configuration adapted to provide a first battery voltage. Another step includes reconfiguring at least a portion of the statically joined plurality of series connected battery cells into a second configuration adapted to provide a second battery voltage. The reconfiguring includes the steps of closing a first processor controlled switch electrically connecting a first voltage pole of a battery cell in the statically joined plurality of series connected battery cells and a first electrical output connection. Next, closing a second processor controlled switch electrically connecting a second voltage pole of a battery cell in the statically joined plurality of series connected battery cells and a second electrical output connection.

In another example embodiment, a method is disclosed where reconfiguring a series joined first bank to a second bank further includes one of two steps. Closing a first intermediate processor controlled switch connected between a second voltage pole of an end positioned battery cell in the first bank and a first voltage pole of a beginning positioned battery cell in the second bank. Alternatively, closing a second intermediate processor controlled switch connected between a first voltage pole of a beginning positioned battery cell in the first bank and a second voltage pole of an end positioned battery cell in the second bank.

In the method of the preceding example embodiment, the processor controlled switch can include one of a pulse width modulation processor controlled switch or a pulse density modulation processor controlled switch. Also, the first voltage pole can be at a higher voltage potential than the second voltage pole.

A further example embodiment includes a method whereby the second processor controlled switch is alternatively switched by pulse width modulation switching or pulse density modulation switching between a first configuration of series connected battery cells exhibiting a first voltage and a second configuration of series connected battery cells exhibiting a second voltage producing an intermediate output voltage between the first voltage and the second voltage.

Another example embodiment includes a method where the reconfigurable battery is alternatively configured to provide energy to at least one electrical load or to receive energy for recharging.

One example electrical load is a vehicle with at least one electrical motor, where the vehicle is one of an electric bicycle, an electric scooter, an electric vehicle, a hybrid automobile, a hybrid truck, an electric powered wheelchair, and an electric powered golf cart.

One example method of recharging the reconfigurable battery is by connecting at least one power source to the battery. One such power source is regenerative charging by applying a vehicle braking action that activates at least one electric motor, inducing current flow to the battery. Another method of recharging is by applying either a rectified AC power source or a direct AC power source, depending on the battery configuration. For example, with dynamic polarity reversal of the battery, a direct AC source can be used without rectification.

A further example embodiment includes a method of monitoring voltage and current of battery power discharge. The method includes the steps of monitoring voltage and current of battery power charge, and controlling the reconfiguration of a plurality of series connected battery cells based on the monitoring. An auxiliary power source for monitoring, for controlling, and for reconfiguring of a plurality of series connected battery cells can also be applied.

Another example embodiment describes a method where a reconfigurable battery voltage output signal includes the steps of smoothing and filtering by providing a capacitive and/or inductive element.

BRIEF DESCRIPTION OF THE DRAWINGS

The present invention will hereinafter be described in conjunction with the appended drawing figures, wherein like reference numerals denote like elements, and:

FIG. 5a shows an example embodiment of a reconfigurable battery in a first battery cell configuration in accordance with the present invention;

FIG. 5b shows an example embodiment of a reconfigurable battery in a second battery cell configuration in accordance with the present invention;

FIG. 5c shows an example embodiment of a reconfigurable battery in a further battery cell configuration in accordance with the present invention;

FIG. 6 shows a further example embodiment of a reconfigurable battery in accordance with the present invention;

FIG. 7a shows an example embodiment of a reconfigurable electric motor assembly in a first configuration in accordance with the present invention;

FIG. 7b shows an example embodiment of a reconfigurable electric motor assembly in a second configuration in accordance with the present invention;

FIG. 8 shows an example embodiment of a reconfigurable electric motor assembly with unequal distribution of load in accordance with the present invention;

DETAILED DESCRIPTION

Figure 1:
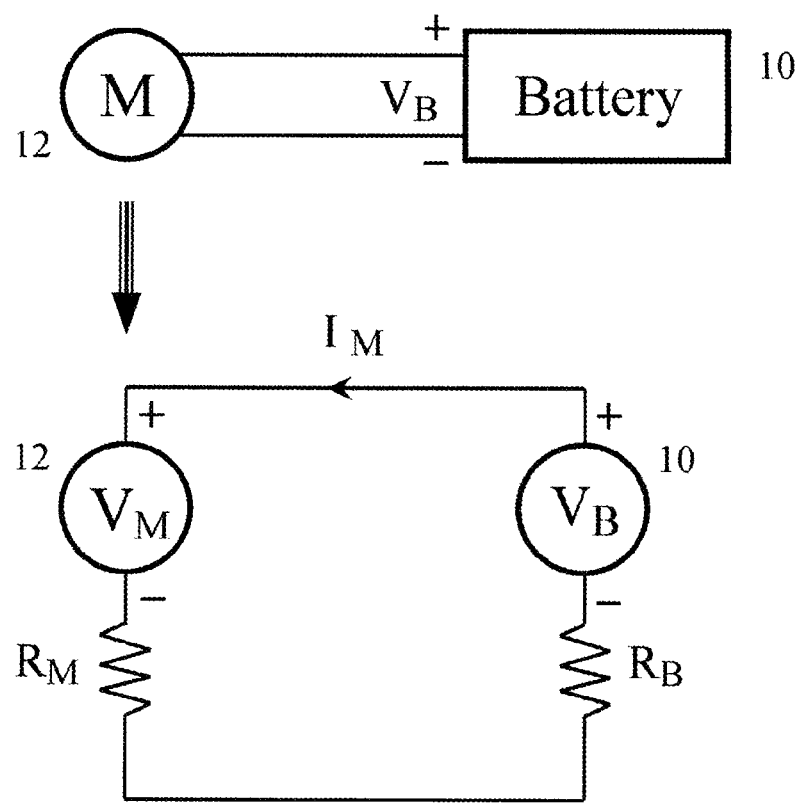
FIG. 1 shows a conventional electric motor and battery configuration.
Figure 2:
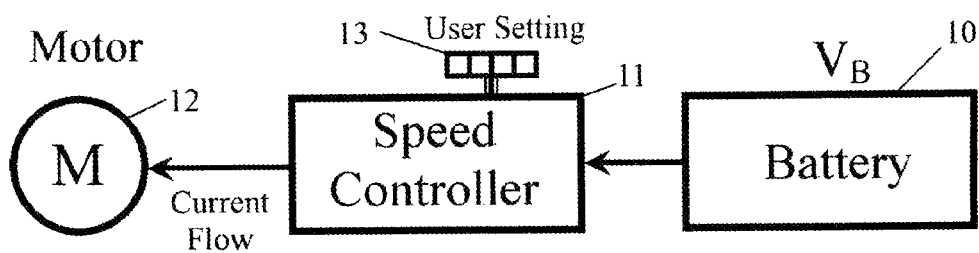
FIG. 2 shows a block diagram of a prior art electric bicycle system.
Figure 3:
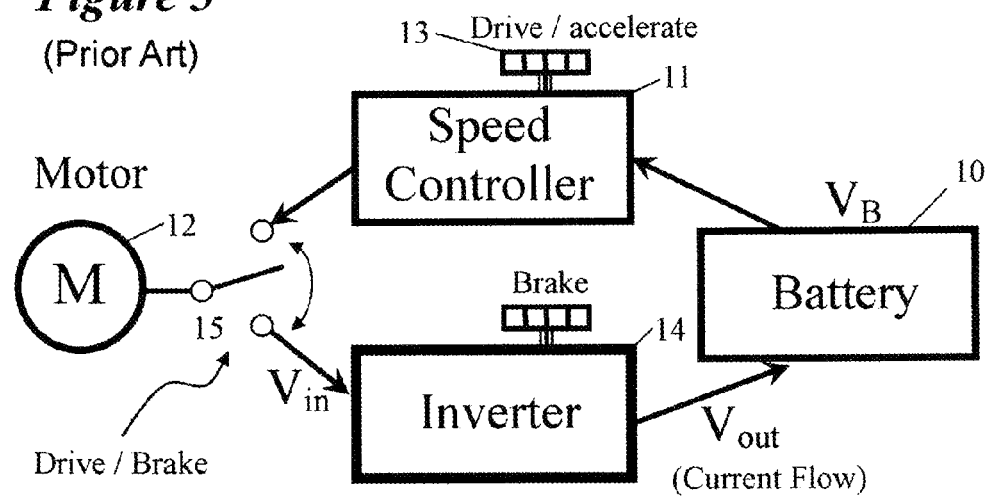
FIG. 3 shows a block diagram of a further prior art electric bicycle system.

The following detailed description provides example embodiments only, and is not intended to limit the scope, applicability, or configuration of the invention. Rather, the detailed description of the example embodiments will provide those skilled in the art with an enabling description for implementing an embodiment of the invention. It should be understood that various changes may be made in the function and arrangement of elements without departing from the spirit and scope of the invention as set forth in the appended claims.

Although the present invention is described in connection with electric bicycles where a rechargeable battery drives an electric motor, those skilled in the art will appreciate that it is equally applicable to other types of electric vehicles and battery charging systems.

In many electro-mechanical system designs (such as an electric bicycle), the complexity of the design problem is managed by breaking the system into separate sub-systems, each providing a specific functionality so that the overall system works well. Each sub-system can be designed more or less independently of the other sub-systems, as long as it meets its given design requirement. A typical prior art electric vehicle design such as an electric bicycle may be divided into the following subsystems: drive train with an electric motor, a speed controller, an inverter, a battery, and perhaps an intelligent central controller that coordinates the other subsystems. As an example, the battery sub-system may typically be supplied by a battery manufacturer with specifications including voltage and current ratings; an inverter designer may work with a specification for a range of possible input voltages from the motor that can be raised high enough to recharge the battery; a mechanical designer would design the drive train and the interface to the motor, and so on, for the other sub-systems. With such an approach, it may be easy to miss system level simplifications or synergies between sub-systems when focusing on one sub-system at a time.

The fundamental problem to be solved when recharging a battery from a motor is to keep the charging voltage higher than the battery voltage. The present invention solves this by effectively lowering the battery voltage during charging periods. This is accomplished in accordance with the present invention by means of a reconfigurable battery. As long as the battery voltage is lower than the voltage generated by the motor, recharging is accomplished. Accordingly, with the present invention, there is no need to raise the voltage out of the motor using an inverter.

A typical battery needed in an electric bicycle must generate 10 s of volts, requiring half a dozen to dozens of battery cells. For example, a typical prior art electric bicycle uses a 36V, 13Ah NiMH battery. Each battery cell would typically generate between 1.2V (e.g. NiCd or NiMH cells) and 3.6 V (LiIo or LiPo cells). Many of these cells must be connected in series to generate the required voltage for the motor.

Figure 4:
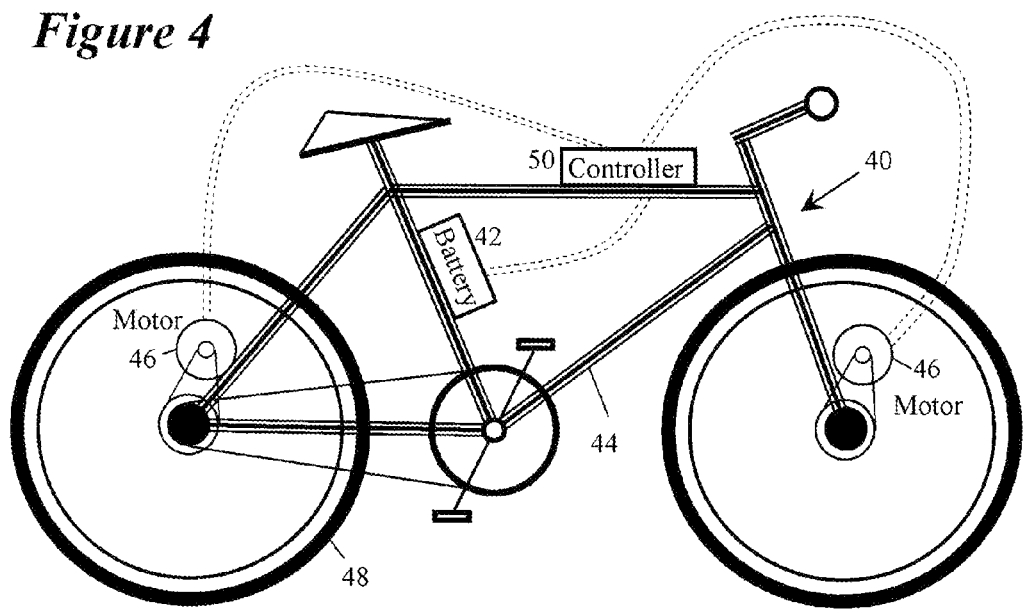
FIG. 4 shows an example embodiment of an electric bicycle in accordance with the present invention.

With the present invention, a reconfigurable battery is provided which is adapted to dynamically re-connect and reconfigure the battery cells as the needs of the system change (e.g., from providing current for driving the motor to receiving current for recharging the battery, and vice versa). FIG. 4 shows a simplified embodiment of an electric bicycle 40 in accordance with the present invention. A configurable battery 42 with a plurality of cells is mounted to a bicycle frame 44. At least one motor 46 is mounted on the frame 44 and adapted to drive a wheel 48 of the bicycle 40. The battery 42 and the motor 46 are both in communication with a controller 50. The controller 50 may be adapted to control the current supplied to the motor 46 from the battery 42 for driving the wheel 48, to control the current supplied from the motor 46 to the battery 42 for recharging the battery 42, and for reconfiguring the battery 42 (or reconfiguring a plurality of motors 46) as discussed in detail below.

FIGS. 5a and 5b illustrate one example embodiment of a reconfigurable battery in accordance with the present invention. FIG. 5a shows a plurality of battery cells 52 of a battery 42 arranged in a first configuration adapted to provide a first battery voltage to an electric motor 46. FIG. 5b shows the battery cells 52 reconfigured into a second configuration adapted to provide a second battery voltage. It should be appreciated that only a portion of the plurality of battery cells may be reconfigured to provide a second configuration. The second battery voltage may be lower than the first battery voltage. The battery 42 can then be charged when the plurality of cells 52 are arranged in the second configuration.

In the first configuration as shown in FIG. 5a, the plurality of battery cells 52 may be arranged in series. In the second configuration as shown in FIG. 5b, the plurality of battery cells 52 may be arranged in parallel.

Alternatively, in the second configuration, only a first portion of the plurality of battery cells 52 may be arranged in parallel and a second portion of the battery cells 52 may be arranged in series. In addition, in a variation of the second configuration as shown in FIG. 5c, the plurality of battery cells 52 may be arranged with at least a first portion of the battery cells in series and a second portion of the battery cells in series, with the first portion and the second portion of the battery cells arranged in parallel. For example, it is noted that in the examples shown with four battery cells 52, the battery 42 can be reconfigured to at least three possible voltages (where Vb is the voltage across each cell 52): 4xVb (all 4 cells in series as in FIG. 5a), 1xVb (all 4 cells in parallel as shown in FIG. 5b), and 2xVb (two pairs of cells in series, with the resulting two pairs arranged in parallel, as shown in FIG. 5c), The charging may comprise regenerative charging provided by the electric motor(s) 46 during a vehicle braking action. In such an example embodiment, at least one of the motor voltage and current of the motor 46 may be monitored. The reconfiguring of the plurality of battery cells 52 may be controlled based on the monitoring. For example, a current sensor 49 could be used to monitor the current through the motor and/or a voltage sensor 58 could be used to monitor the motor voltage, and the sensors 49 and 58 could relay the voltage and/or current information needed to a controller (e.g., controller 50 of FIG. 4) to make a decision on how to reconfigure the battery 42 to the desired battery voltage. Alternatively, a sensor could monitor the motor speed in order to provide equivalent information to the controller 50. In addition, an auxiliary power source (e.g., backup battery 56) may be provided for powering the controller 50 and the sensors 49 and 58.

In addition, an amount of braking power required by the braking action may be monitored and provided to the controller 50, and the reconfiguring of the plurality of battery cells 52 may be controlled based on the monitoring. The applied braking force may be monitored by current sensor 49 (or by circuitry provided within the electric motor 46 itself) and communicated to the controller 50.

Switching means 57 may be provided, enabling the reconfiguring of the plurality of battery cells. The switching means 57 may be connected to at least one of the battery cells. For example, the switching means 57 may comprise one of pulse width modulation switching means or pulse density modulation switching means controlled by the controller 50.

A speed control switch 59 may also be provided. Switch 59 may be a pulse width modulation switching mechanism and the controller 50 may be a PWM control system adapted to adjust the on-off duty cycle of the PWM switch 59 between the motor 46 and the battery 42. The current sensor 49 may be used to calculate the average amount of current flowing. For example, if the desired amount of current cannot be maintained because the voltage difference between the motor 46 and the battery 42 is too small, the battery 42 may be reconfigured to provide a lower voltage during regenerative charging, or a higher battery voltage for driving or accelerating. For a typical DC motor, the torque of a motor (or the braking force of the motor) is proportional to the current flowing in (or out) of the motor.

The backup battery 56 may or may not be needed, and may be used to run the control circuits and the sensors 49 and 58. This backup battery 56 can be kept charged whenever the motor voltage is higher, with the additional switch 55 controlling the amount of charging.

In one example embodiment, the battery 42 maybe provided in an electric vehicle and be adapted for regenerative charging. For example, the battery 42 may be provided in an electric bicycle (as shown in FIG. 4). Those skilled in the art will appreciate that the reconfigurable battery 42 may be used in other types of electric vehicles, such as an electric scooter, an electric automobile, a hybrid vehicle, an electric powered wheelchair, an electric powered golf cart, or the like. Also, it should be appreciated that the reconfigurable battery of the present invention may be adapted for use in virtually any type of device that requires the use of rechargeable batteries, in order to reduce the time needed to charge such batteries.

Thus, with the present invention, the battery 42 may be dynamically reconfigured (e.g., via the controller 50) during operation of the system. For example, the controller 50 may configure the battery cells 52 in a series configuration when the electric vehicle is in a drive mode, as shown in FIG. 5*a*, and may configure the battery cells 52 in a parallel configuration during recharging or regenerative braking, as shown in FIG. 5*b*.

FIG. 6 shows an alternative embodiment where the main PWM switch (switch 59 of FIGS. 5*a* and 5*b*) is not needed. In this example embodiment, the reconfiguration switches 57 are controlled in PWM fashion (or alternatively PDM—Pulse Density Modulation).

In some electric bicycle designs, it may be advantageous to use more than one electric motor. For example, one motor may be provided for the front wheel and one motor may be provided for the rear wheel in order to double the drive torque and be able to provide regenerative braking at both wheels. Other possible configurations may call for more motors, possibly two for each wheel. With the present invention, multiple electric motors can be reconfigured to gain certain advantages, similar to reconfiguring of the battery as discussed above. One motivation for reconfiguring an arrangement of electric motors would be to increase or decrease the over-all motor voltage to help regenerative braking, especially at low speeds where each individual motor voltage could be too low to charge even a single battery cell.

Another motivation would be to increase the torque of the motors by arranging the motors in parallel. More current can flow to the aggregate motor(s) when in a parallel arrangement, as if the vehicle is in a "low gear." If the battery is reconfigured into a parallel arrangement as well, it will be able to supply the higher current the motor demands. Thus, by reconfiguring the arrangement of multiple electric motors as well as the arrangement of multiple battery cells, one may be able to find the optimum combination of series/parallel arrangements for the motors and series/parallel arrangements for the battery cells to accomplish varying situations for the electric vehicle, whether in a drive mode or in a regenerative braking mode.

Accordingly, the present invention also includes methods and apparatus for reconfiguring electric motors, which as discussed below may be combined with the methods and apparatus for reconfiguring a battery.

In one example embodiment as shown in FIG. 7*a*, two or more electric motors 46 are arranged in a first configuration adapted to provide at least one of a first torque output during a driving action and a first regenerative voltage output during a braking action. As shown in FIG. 7*b*, the two or more electric motors 46 may be reconfigured into a second configuration adapted to provide at least one of a second torque output during the driving action and a second regenerative voltage output during the braking action.

The first configuration as shown in FIG. 7*a* may comprise the two or more electric motors arranged in parallel. The second configuration as shown in FIG. 7*b* may comprise the two or more electric motors arranged in series.

In one example embodiment, a battery 42 for operating the two or more electric motors 46 may be provided (e.g., a battery 42 as shown in FIG. 5*a*, 5*b*, 5*c*, or FIG. 6). The battery 42 may comprise a plurality of battery cells, and one of the first or second configuration of the two or more electric motors 46 may be selected for regenerative charging of the battery 42.

The battery 42 may comprise a plurality of battery cells 52, which may be arranged in a first battery configuration (e.g., as shown in FIG. 5*a*) adapted to provide a first battery voltage for operating the two or more electric motors 46 during the driving action. At least a portion of the plurality of battery cells 52 may be reconfigured into a second battery configuration (e.g., as shown in FIG. 5*b*) adapted to provide a second battery voltage during the braking action, where the second battery voltage is lower than the first battery voltage. The battery 42 can then be charged when the two or more electric motors 46 are arranged in the second configuration and the plurality of cells 52 are arranged in the second battery configuration.

In the first battery configuration, the plurality of battery cells 52 may be arranged in series as shown in FIG. 5*a*. In the second battery configuration, the plurality of battery cells may be arranged in parallel as shown in FIG. 5*b*.

Alternatively, in the second battery configuration, a first portion of the plurality of battery cells 52 may be arranged in parallel and a second portion of the battery cells 52 may be arranged in series. In addition, in the second battery configuration, the plurality of battery cells 52 may be arranged with at least a first portion of the battery cells 52 in series and a second portion of the battery cells 52 in series, with the first portion and the second portion of the battery cells 52 arranged in parallel (as shown in FIG. 5*c*).

The voltage (or current) of the motors 46 may be monitored (e.g., via sensors 58 and 49 discussed above in connection with FIGS. 5*a* and 5*b*). Based on the monitoring, at least one of the reconfiguring of the plurality of battery cells 52 and the reconfiguring of the two or more electric motors 46 may be controlled (e.g., by controller 50). An auxiliary power source (e.g., backup battery 56) may be provided for powering the controller 50 and the sensors 49 and 58.

In addition, at least one of an amount of braking power required by the braking action and an amount of drive power required by the driving action may be monitored. For example, the applied braking force may be monitored by current sensor 49 (or by the circuitry provided within the electric motor 46 itself), and communicated to the controller 50. At least one of the reconfiguring of the plurality of battery cells 52 and the reconfiguring of the two or more electric motors 46 may be controlled based on the monitoring.

Battery cell switching means 57 may be provided to enable the reconfiguring of the plurality of battery cells 52 (as discussed above). Motor switching means 62 (FIGS. 7a, 7b and 8) may be provided to enable the reconfiguring of the two or more electric motors 46. The motor switching means 62 may be connected to at least one of the electric motors 46. The motor switching means 62 may comprise, for example, one of pulse width modulation switching means or pulse density modulation switching means.

In one example embodiment, two or more electric motors 46 may be provided in an electric vehicle adapted for regenerative braking. For example, the two or more electric motors 46 may be provided in an electric bicycle, an electric scooter, an electric automobile, a hybrid vehicle, an electric powered wheelchair, an electric golf cart, or the like.

In embodiments of a reconfigurable battery, a reconfigurable electric motor assembly, or a combination thereof in which a single PWM switch (e.g., switch 59) is used, the controller 50 may be a PWM control system adapted to adjust the on-off duty cycle of the PWM switch between the motor and the battery. The current sensor 49 may be used to calculate the average amount of current flowing. If the desired amount of current cannot be maintained because the voltage difference between the motor 46 and the battery 42 is too small, either the battery 42 or the motor 46 is reconfigured to increase the voltage difference in the right direction (higher motor voltage for regenerative braking, or higher battery voltage for driving or accelerating.)

As discussed above, a speed control switch 59 may also be provided, which may comprise a pulse width modulation switching mechanism. Those skilled in the art will appreciate that an efficient switch is needed to accomplish the electric motor reconfiguration, and that it may also be possible to use multiple FET switches in place of the single PWM switch 59, especially when a parallel motor and a parallel battery combination is needed. It should also be appreciated that the single PWM switch 59 can be replaced by a variable resistance system, as long as the current flow can be regulated. A true variable resistor would dissipate more heat than a PWM switch, but should provide a workable alternative.

FIG. 8 shows a further example embodiment which provides different drive torque and regenerative braking for each motor 46, using two PWM switches 59 and three motor switching means 62. For example, with the FIG. 8 embodiment it is possible to apply greater torque from a motor 46 to a rear wheel of an electric bicycle 40 than from a motor 46 to a front wheel of the electric bicycle 40 during acceleration, and to obtain greater regenerative charging from a motor 46 at the front wheel of an electric bicycle than from a motor 46 at a rear wheel of an electric bicycle during braking.

FIGS. 9a through 9h illustrate an alternative example embodiment of a variable voltage reconfigurable battery and method in accordance with the present invention. The Figures show a single bank of a statically joined plurality of series connected battery cells 200 of a battery 202. A statically joined plurality of series connected battery cells 200 have no additional circuit elements, such as switches, that can break an electrical connection between adjacent battery cells. Each such group of statically joined plurality of series connected battery cells 200, is designated as a "Bank". Banks of battery cells 200 can be configured together in series or parallel connection.

In FIGS. 9a through 9h a bank of seven (7) battery cells 200 of a battery 202 arranged in a series configuration is shown. The battery cells are designated Bt1 through Bt7. Each battery cell 200 has a first voltage pole 204 and a second voltage pole 206. The first voltage pole 204 of each battery cell 200 shown is at a higher direct current (DC) voltage potential than the second voltage pole 206, and therefore the first voltage pole 204 is designated as "+" and the second voltage pole 206 is designated as "−". A first electrical output connection 210 is designated as Vout_p, and a second electrical output connection 212 is designated as Vout_n. The first electrical output connection 210 may function as the positive terminal of a battery 202, while the second electrical output connection 212 may function as the negative terminal of a battery 202. At least one switching means 208 provides electrical connection between the first voltage pole 204 of each battery cell 200 in the series to a first electrical output connection 210 (designated Vout_p).

In the Figures, the switching means 208 designated sequentially SW_p0 through SW_p6 connect the positive pole of each battery cell to Vout_p. Also, at least one switching means 208 provides electrical connection of a second voltage pole 206 of each battery cell 200 in the series to a second electrical output connection 212 (designated Vout_n). The switching means 208 designated sequentially SW_n1 through SW_n7 connect the negative pole of each battery cell to Vout_n. Additionally, at least one switching means 208 can electrically connect the first voltage pole 204 of a battery cell 200 at the beginning of the plurality of series connected battery cells 200 to the second electrical output connection 212.

The switching means 208 designated SW_n0 connects the positive pole of BT1 to Vout_n, At least one switching means 208 can electrically connect the second voltage pole 206 of an end battery cell 200 in the statically joined plurality of series connected battery cells 200 to the first electrical output connection 210. In the Figures, switching means 208 designated SW_p7 connects the negative pole of BT7 to Vout_p. The switching means 208 may, for example, comprise MOSFET transistors. In some implementations, Pulse Width Modulation or Pulse Density Modulation circuitry is included as part of the switching means. In other embodiments, the MOSFET transistors can be configured without PWM or PDM.

Closing a switching means 208 between a first voltage pole 204 and the first electrical output connection 210, and closing a switching means 208 between a second voltage pole 206 and the second electrical output connection 212 provides a voltage differential at the electrical output connections, and allows current to flow when the battery 202 is connected to a load (or to a battery charging circuit). In the Figures, output voltage Vout, is the difference in potential between the first electrical output connection 210 designated Vout_p, and the second electrical output connection 212 designated Vout_n.

The battery cells 200 are reconfigured to provide an output voltage that is approximately equal to the voltage summation of the electrically reconfigured battery cells 200, and is in a range between zero volts and a maximum output voltage for the plurality of series connected battery cells 200. The voltage is determined by the number and technology of the cells provided.

Any of the well known battery types can be used with the inventive structure. One such battery technology that is particularly suited for use with the present invention is the nano phosphate based lithium ion battery technology. Such batteries can handle more than an order of magnitude more current than prior battery technologies without becoming unstable. It is expected that other battery technologies that are developed in the future will also be suitable for use with the series battery embodiments disclosed herein.

Figure 9A:
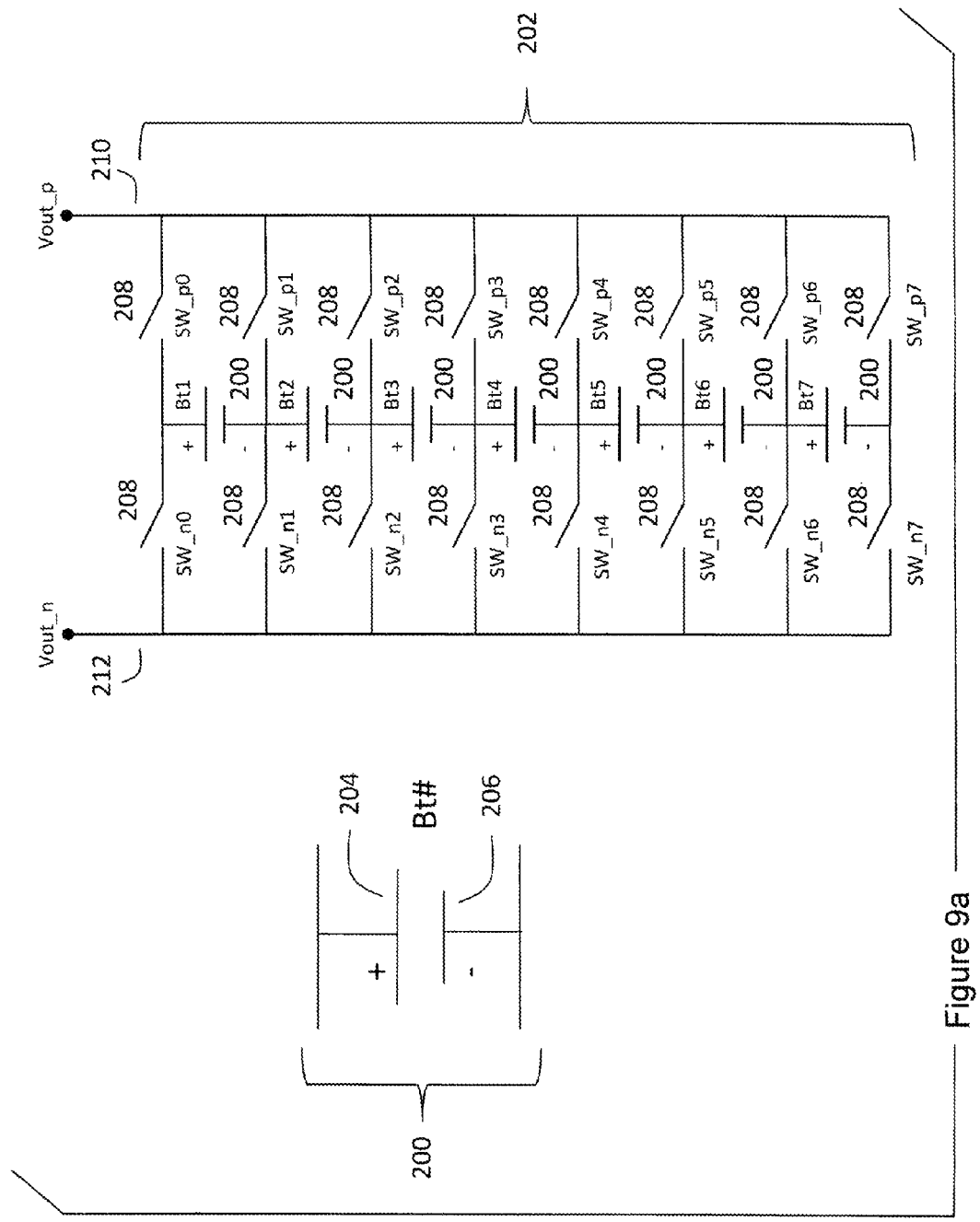
FIG. 9a shows an example embodiment of a reconfigurable battery in accordance with the present invention.
Figure 9B:
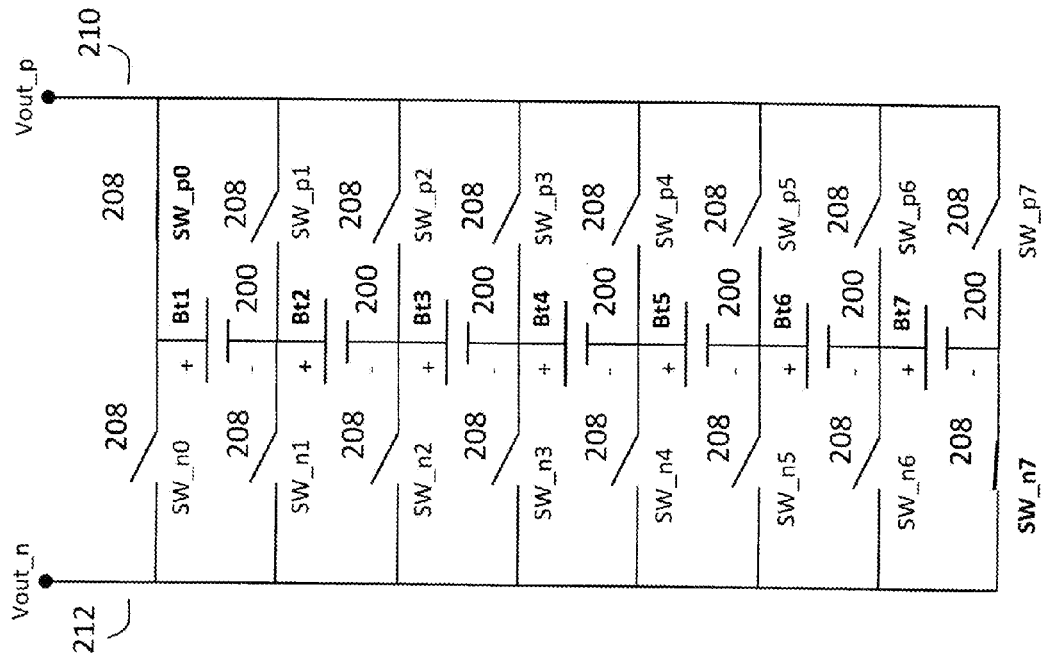
FIG. 9b shows an example embodiment of a configured reconfigurable battery with maximum output voltage in accordance with the present invention.

FIG. 9a shows a configuration with all switches 208 in an open state such that no current flow occurs, and Vout=0 volts. FIG. 9b shows a configuration whereby maximum voltage is realized from the bank of statically joined plurality of series connected battery cells 200 by closing the switching means 208 (in particular, switch SW_p0) connecting the positive pole of the first battery cell, Bt1, to Vout_p and closing the switching means 208 (in particular, switch SW_n7) connecting the negative pole of the last battery cell, Bt7, to Vout_n. Vout equals the sum of the voltages of connected battery cells in the series Bt1 through Bt7. For example, if each battery cell 200 is Lithium Ion technology with nominal voltage of 3.6V, for this configuration of seven battery cells, Vout=25.2 volts minus switching and other losses.

Figure 9C:
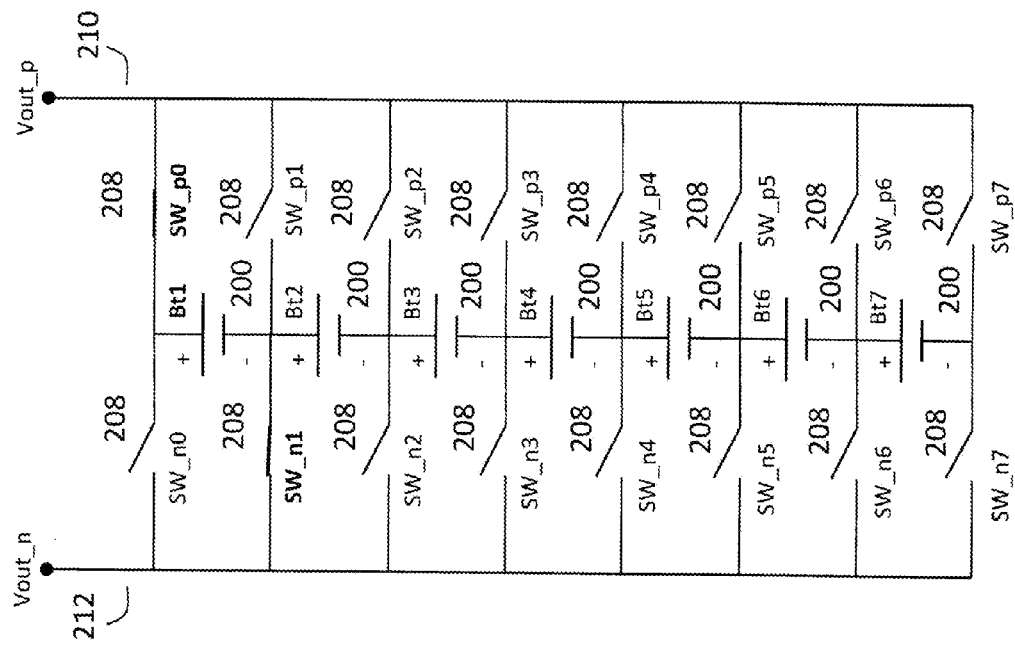
FIG. 9c shows an example embodiment of a configured reconfigurable battery with single battery cell output voltage in accordance with the present invention.

FIG. 9c shows an example configuration whereby a single cell voltage is realized at the output from the statically joined plurality of series connected battery cells 200. Voltage of cell Bt1 is realized between output connections Vout_p and Vout_n by closing switches SW_p0 and SW_n1.

Figure 9D:
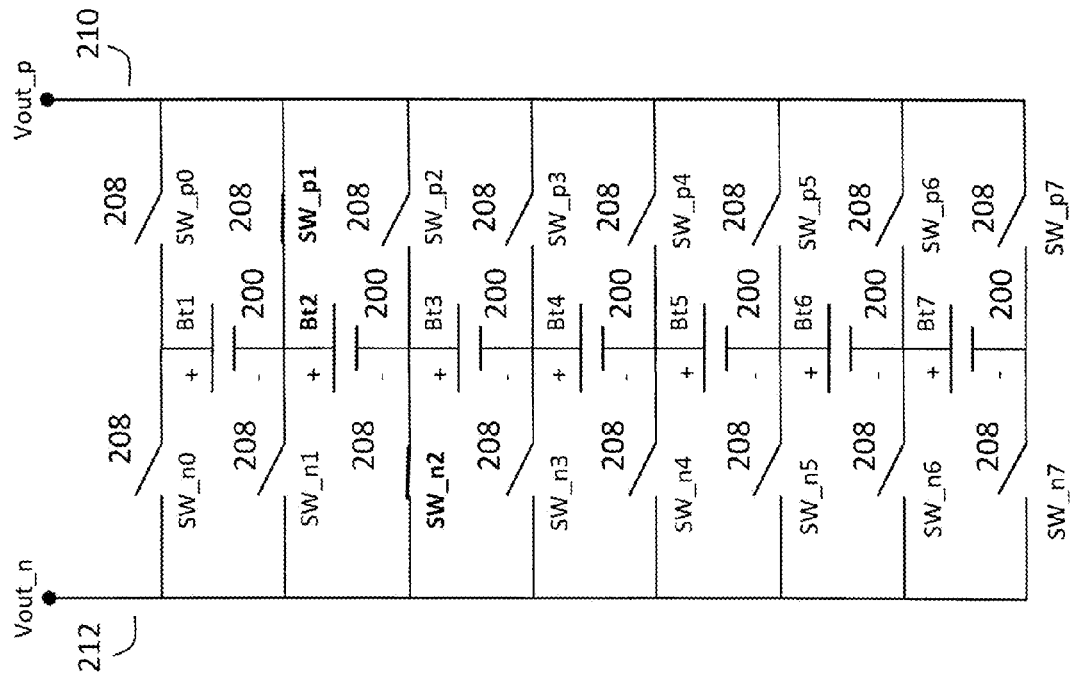
FIG. 9d shows an alternative example embodiment of a configured reconfigurable battery with single battery cell output voltage in accordance with the present invention.

FIG. 9d shows an alternative example configuration, where the output voltage is also about equal to a single cell voltage by connecting battery cell Bt2 to the first electrical output connection 210 and the second electrical output connection 212. Voltage of cell Bt2 is realized between output connections Vout_p and Vout_n by closing switches SW_p1 and SW_n2.

Figure 9E:
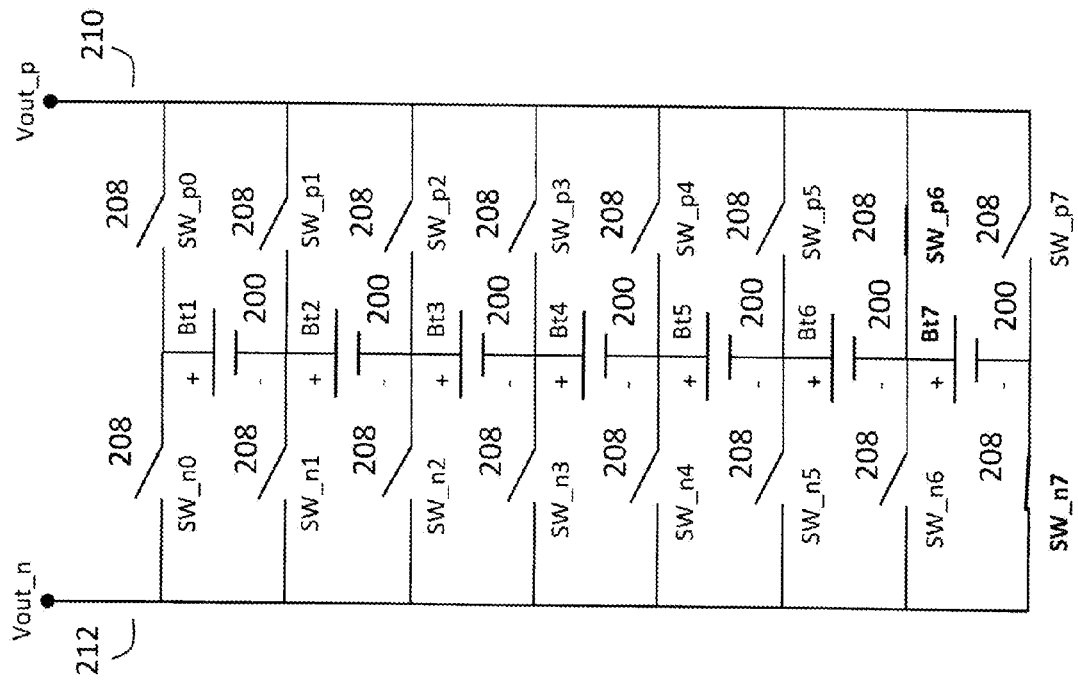
FIG. 9e shows an example embodiment of a configured reconfigurable battery with single battery cell output voltage in accordance with the present invention.

FIG. 9e shows another alternative example configuration, where output voltage is about equal to the voltage of a single battery cell, Bt7. Voltage of cell Bt7 is realized between output connections Vout_p and Vout_n by closing switches SW_p6 and SW_n7.

In any series configuration of a plurality of battery cells as described in this embodiment, there are N ways to realize a single cell voltage, where N is the number of cells in the battery.

Figure 9F:
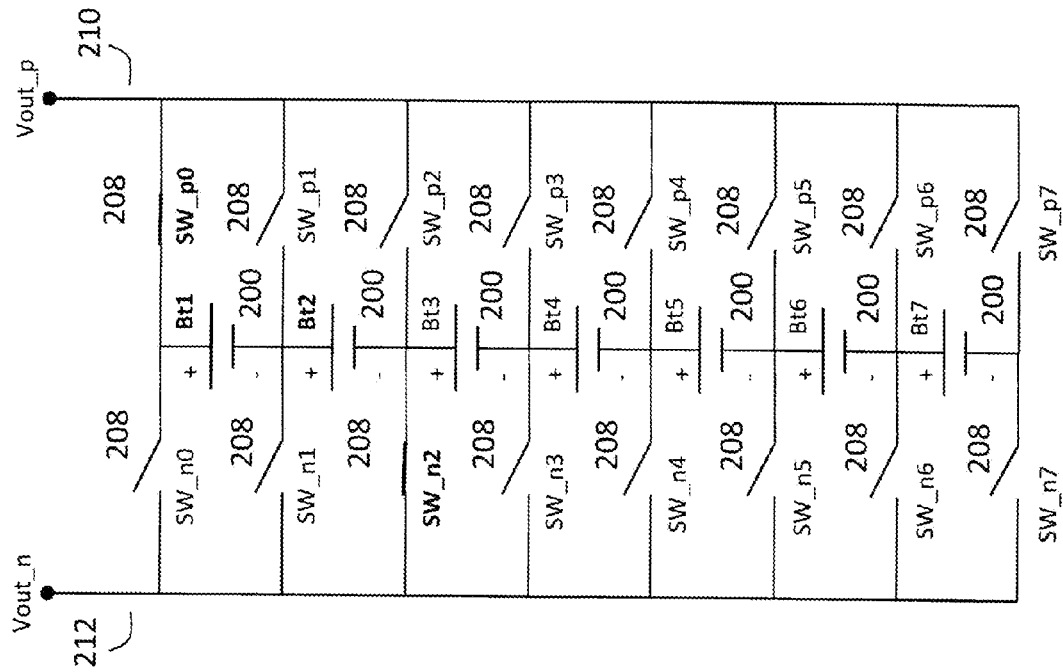
FIG. 9f shows an example embodiment of a configured reconfigurable battery with two battery cell output voltage in accordance with the present invention.
Figure 9G:
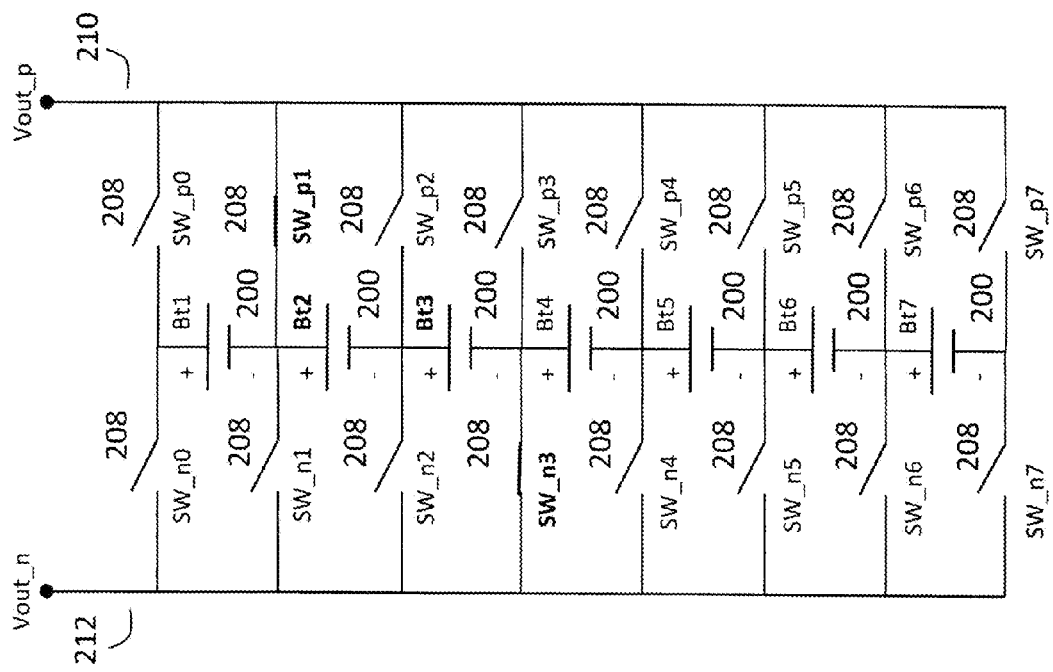
FIG. 9g shows an alternative example embodiment of a configured reconfigurable battery with two battery cell output voltage in accordance with the present invention.
Figure 9H:
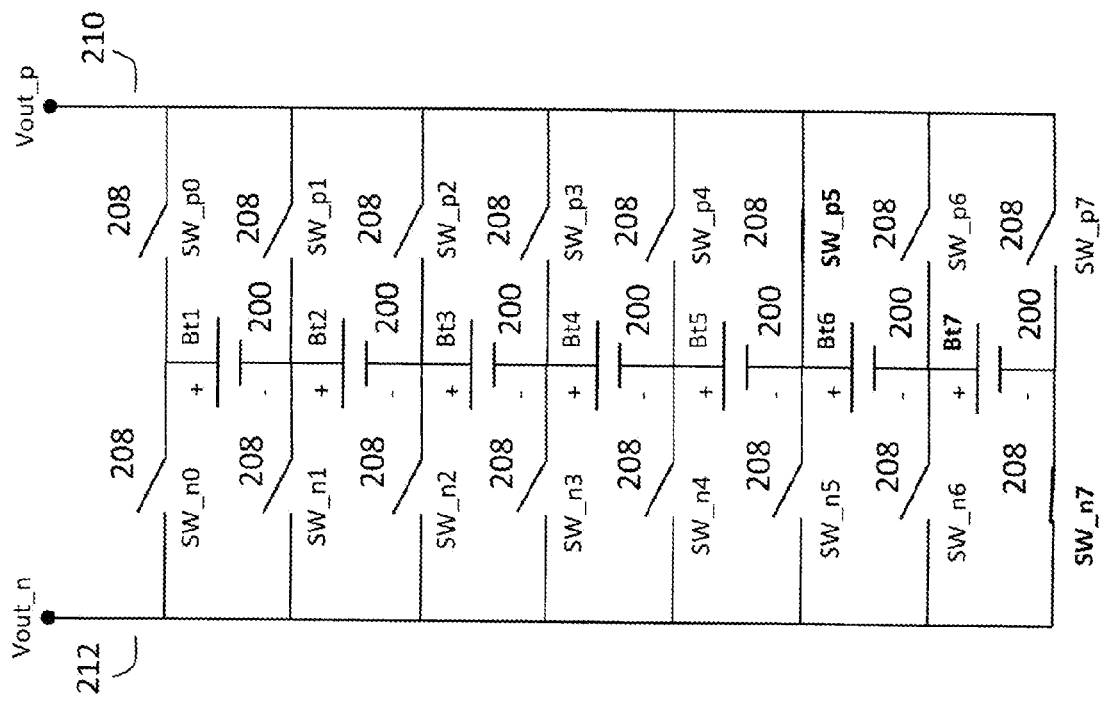
FIG. 9h shows a second alternative example embodiment of a configured reconfigurable battery with two battery cell output voltage in accordance with the present invention.

FIG. 9f shows a configuration whereby an intermediate voltage is realized at the voltage output from the series configured plurality of battery cells 200. In this example, the voltage sum of two (2) battery cells 200 is realized. In particular, the voltage sum of cells Bt1 and Bt2 is realized between output connections Vout_p and Vout_n by closing switches SW_p0 and SW_n2. FIG. 9g and FIG. 9h show two additional alternate configurations of connecting two series connected battery cells to the voltage output.

In a series configuration of a plurality of battery cells 200, as described in this exemplary embodiment, there are N−1 ways to realize a two-cell voltage, where N is the number of cells 200 in the battery.

Without including configurations of voltage polarity reversal, for any number of N statically joined plurality of series connected battery cells 200 as described in this exemplary embodiment, with a switched set of P electrically contiguous battery cells 200, there are (N−P)+1 ways to configure them.

Voltage polarity may be selectively reversed by activating a switching means 208 that would connect a first voltage pole 204 of a battery cell 200 to a second electrical output connection 212 instead of connecting it to a first voltage electrical output connection 210, and connecting a second voltage pole 206 to a first electrical output connection 210. For example, in the example configuration shown in FIG. 9c, closing switching means SW_n0 instead of SW_p0, and SW_p1 instead of SW_n1 would cause polarity reversal at the electrical output connections 210 and 212. Such polarity reversal may be useful for motor activated braking.

One useful consequence of having (N−P)+1 ways to configure P cells is that it allows cells to be load balanced in a time sequential manner, maintaining nominal voltage by alternating drain on sets of P electrically connected cells.

A useful consequence of connecting the battery cells 200 in a series configuration without switching means 208 between the cells allows switch induced voltage loss to be kept minimal because only two switching means 208 need be activated when an electrical load is applied.

Figure 10A:
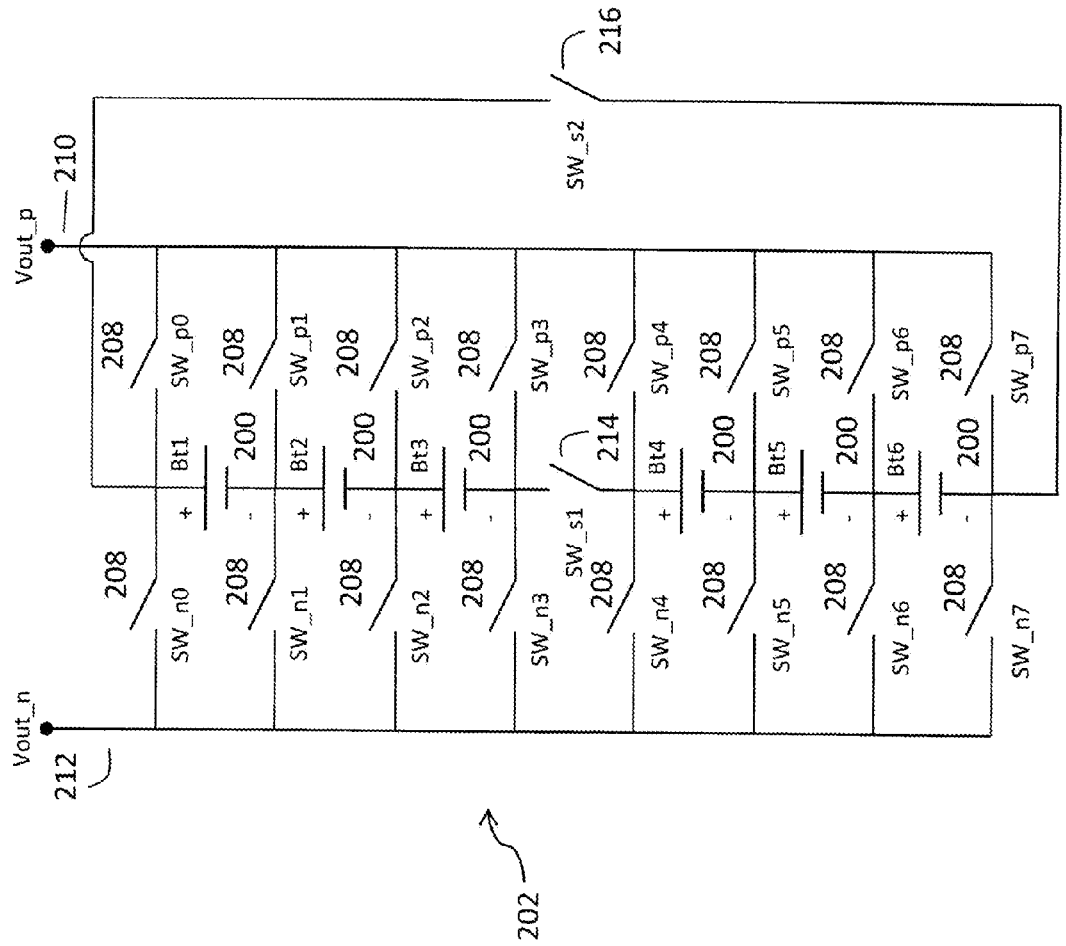
FIG. 10a shows an example embodiment of a reconfigurable battery with two banks of battery cells in accordance with the present invention.
Figure 10B:
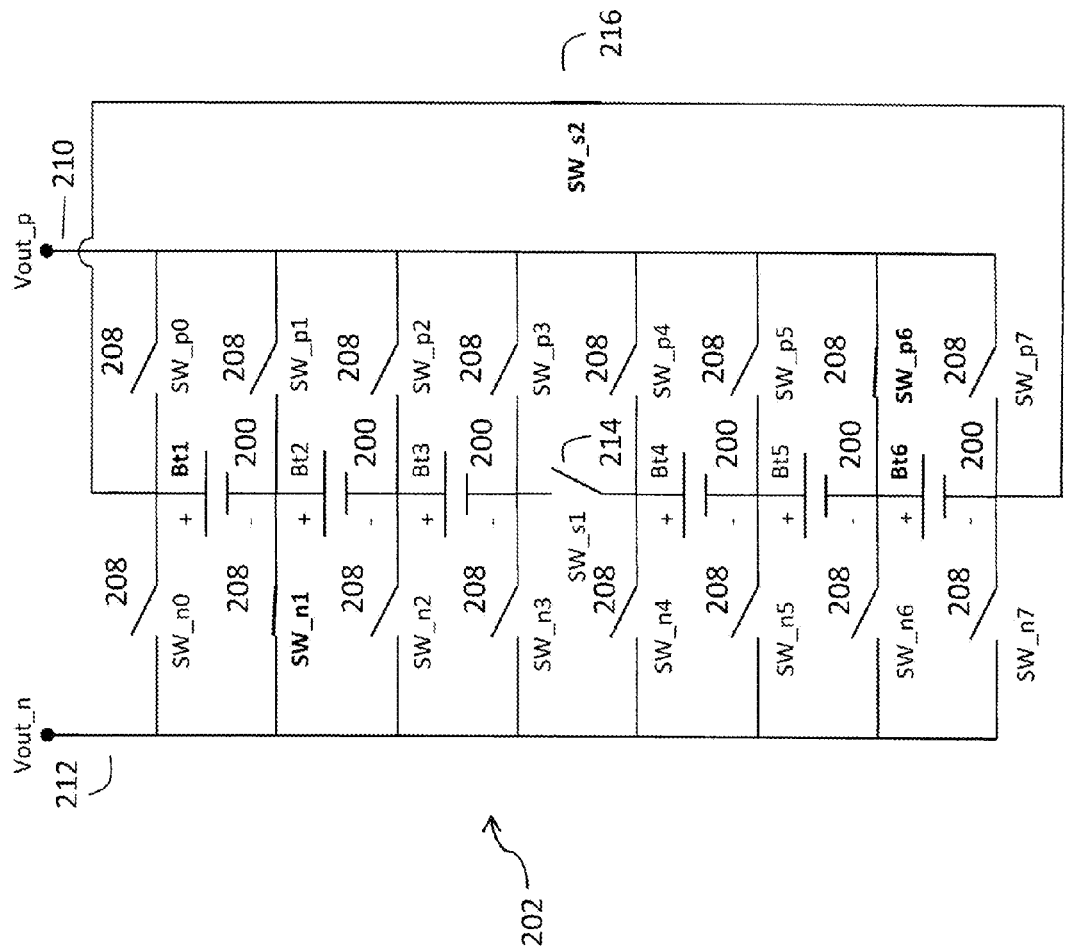
FIG. 10b shows an example embodiment of a configured reconfigurable battery with two banks of battery cells in accordance with the present invention.
Figure 10C:
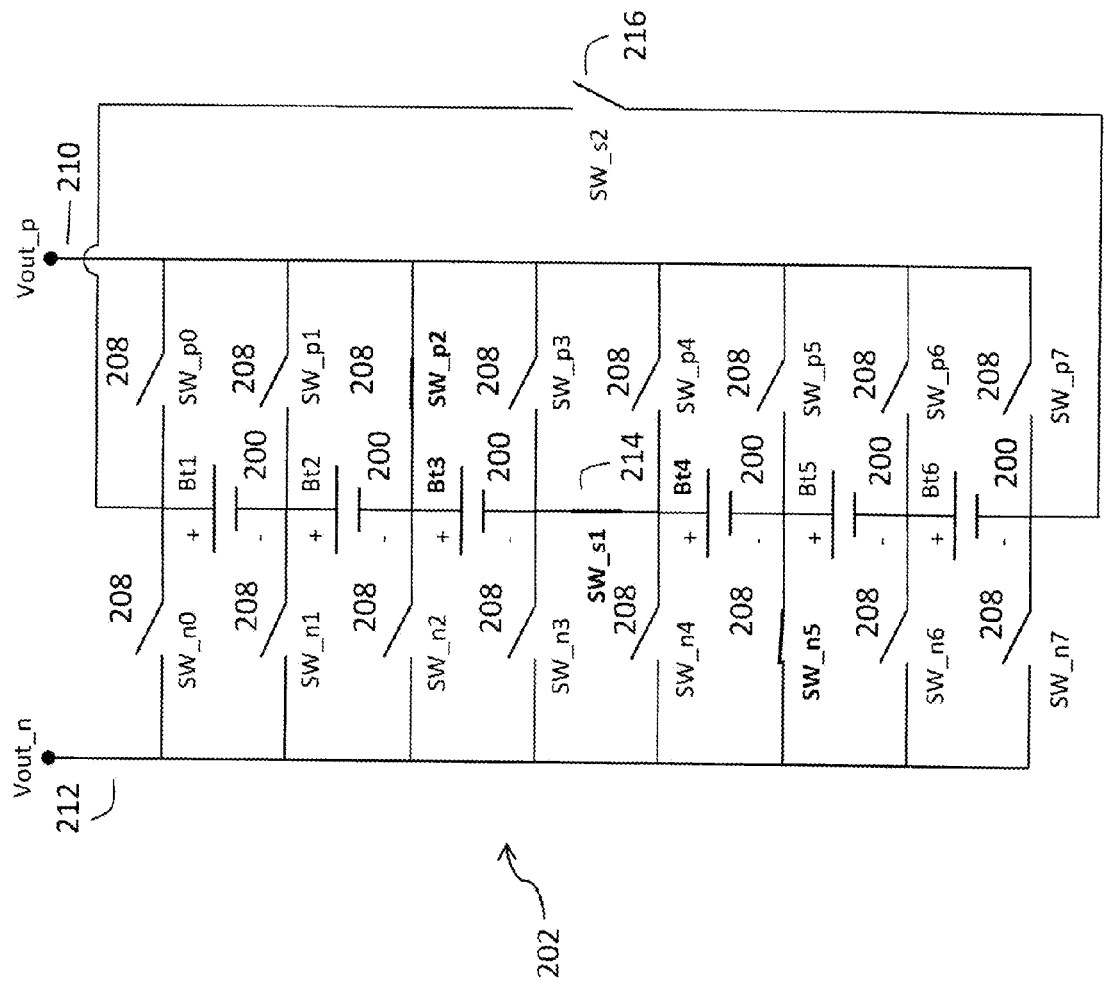
FIG. 10c shows an alternative example embodiment of a configured reconfigurable battery with two banks of battery cells in accordance with the present invention.

Another alternative example embodiment of a reconfigurable battery and method in accordance with the present invention is shown in FIGS. 10a through 10c. These Figures show a first bank of statically joined plurality of series connected battery cells 200, designated Bt1 through Bt3, that is joined to a second bank of statically joined plurality of series connected battery cells 200, designated Bt4 through Bt6, in a series connection. The switching means 208 designated sequentially SW_p0 through SW_p7 connect the batteries Bt1 through Bt6 to Vout_p. The switching means 208 designated sequentially SW_n1 through SW_n7 connect the batteries Bt1 through Bt6 to Vout_n A first intermediate switching means 214, designated as SW_s1, is connected between a second ("−") voltage pole 206 of an end positioned battery cell in a first bank, designated as Bt3, and a first ("+") voltage pole 204 of a beginning positioned battery cell in a second bank, designated as Bt4. A second intermediate switching means 216 is connected between a first ("+") voltage pole 204 of a beginning positioned battery cell, designated as Bt1, in a first bank and a second ("−") voltage pole 206 of an end positioned battery cell in a second bank, designated as Bt6. Essentially two (2) groupings of three (3) battery cells 200, referred to as banks, are configured in the example configuration. The first electrical output connection of the two banks are commonly connected, designated as Vout_p. Also, the second electrical output connection of the two banks are commonly connected, designated as Vout_n. It should be appreciated that additional banks can be provided in a similar configuration.

The placement of a switching means intermediate between the banks of battery cells effectively separates connectivity between two adjacent cells when the switches are open, resulting in the two banks of battery cells that can be independently configured. Each independent bank of statically joined plurality of series connected battery cells 200 functions in the manner described in the example embodiment of FIGS. 9a through 9h. The switching means 208, first intermediate switching means 214, and second intermediate switching means 216 may be MOSFET transistors with, e.g., Pulse width Modulation or Pulse Density Modulation circuitry included.

If the battery cells to be configured sit in a single bank, closing a switching means 208 between a first voltage pole 204 and the first electrical output connection 210, and closing a switching means 208 between a second voltage pole 206 and the second electrical output connection 212 manifests output voltage. However, if connection is desired between a battery cell 200 that sits in one bank and a battery cell 200 that sits in another bank, either the first intermediate switching means 214 or the second intermediate switching means 216 must be closed to realize voltage between the output connectors 210 and 212. To prevent a short circuit in the series configured battery 202, the first and second intermediate switches 214 and 216 may not both be simultaneously closed. With the first and second intermediate switches 214 and 216 both set in an open state, the two banks are connected in parallel.

FIG. 10a shows an example configuration of a series connected reconfigurable battery 202 with all switching means in an open state such that no voltage appears at the output. Intermediate switches SW_s1 and SW_s2 are open, such that the two banks of cells are in a parallel connection. All switches 208 in the banks are also open so that Vout is equal to zero volts.

FIG. 10b shows an example configuration where two battery cells 200 on opposite ends of the two banks, battery cells Bt1 and Bt6, are electrically connected in series through switching means SW_s2. Closed switching means SW_n1 connects battery cell Bt1 to Vout_n and closed switching means SW_p6 connects Bt6 to Vout_p. At the same time, closed second intermediate switching means SW_s2 configures voltage summation of battery cells Bt1 and Bt6.

FIG. 10c shows a configuration where two adjacent battery cells Bt3 and Bt4, one in each bank, are configured through the first intermediate switching means 214. Closed switching means SW_p2 connects battery cell Bt3 to Vout_p, closed switching means SW_n5 connects Bt4 to Vout_n, and closed first intermediate switching means SW_s1 configures voltage summation of battery cells Bt3 and Bt4.

The present embodiment is useful because it permits series connection between battery cells 200 on opposite ends of a plurality of battery cells 200 without requiring electrical connection with cells occupying the middle section of battery cells 200. This helps with battery discharge load distribution and selective charging of cells. This example embodiment affords increased configuration flexibility while only increasing active switching overhead by the two switching means 214 and 216 over the embodiment of FIG. 9a through 9h.

Figure 11:
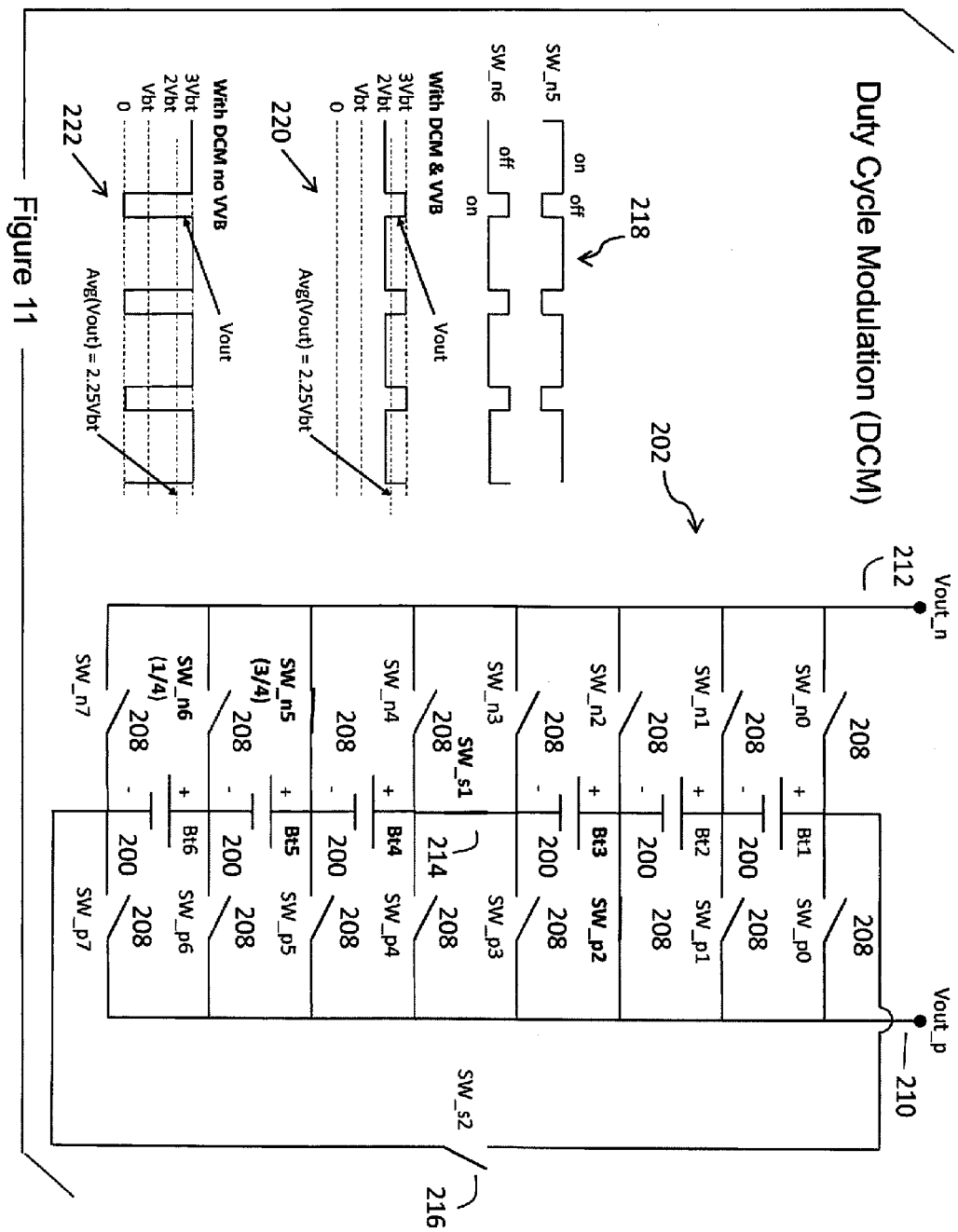
FIG. 11 shows an example embodiment of duty cycle modulation of a configured reconfigurable battery with two banks of battery cells in accordance with the present invention.

Another alternative example embodiment of a method of reconfiguring a battery 202 in accordance with the present invention for series connected battery cells 200 is shown in FIG. 11. The switching means 208 further includes Duty Cycle Modulation ("DCM") by alternatively switching between a first configuration of series connected battery cells 200 exhibiting a first voltage and a second configuration of series connected battery cells 200 exhibiting a second voltage. Duty cycle modulation produces an intermediate output voltage ranging between a first voltage and a second voltage. The example configuration illustrated in FIG. 11 shows modulation of switching means SW_n5 connected to battery Bt4 alternatively switching between an open and closed state. Switching means SW_n6 connected to battery Bt5 inversely minors the cycle of switching means SW_n5 by alternatively switching between a closed and open state. As a result, output voltage is averaged between a voltage of two series connected cells 200 and three series connected cells 200. This causes a relatively small voltage difference during switch cycling. The small voltage change is contrasted with a significantly larger voltage change that would occur if the three series connected batteries were to toggle between an off and on state. The result of duty cycle modulation is intermediate control of output voltage with reduced switching transient for voltage, current, and resulting motor torque.

A simulated digital pulse trace 218 and a simulated voltage trace 220 are shown in FIG. 11. The simulated digital pulse trace 218 demonstrates timing of alternating on and off states of switches SW_n5 and SW_n6. The simulated voltage trace 220 shows the corresponding output voltage, Vout, as a function of time. For this example embodiment, the on state duty cycle of switching means SW_n6 is a quarter of that for switching means SW_n5. As a result, the average output voltage for this example embodiment is equal to ¾(voltage (BT3)+voltage(BT5))+¼(voltage(BT3)+voltage(BT5)+voltage(BT6))=2.25 Voltage (BT) if all battery cell 200 voltages are equal. An illustrative voltage trace using full voltage on-off pulse width modulation 222 is shown for comparison. Note the larger voltage swing between the on and off states without a variable voltage battery, as shown in simulated trace 222.

Figure 12:
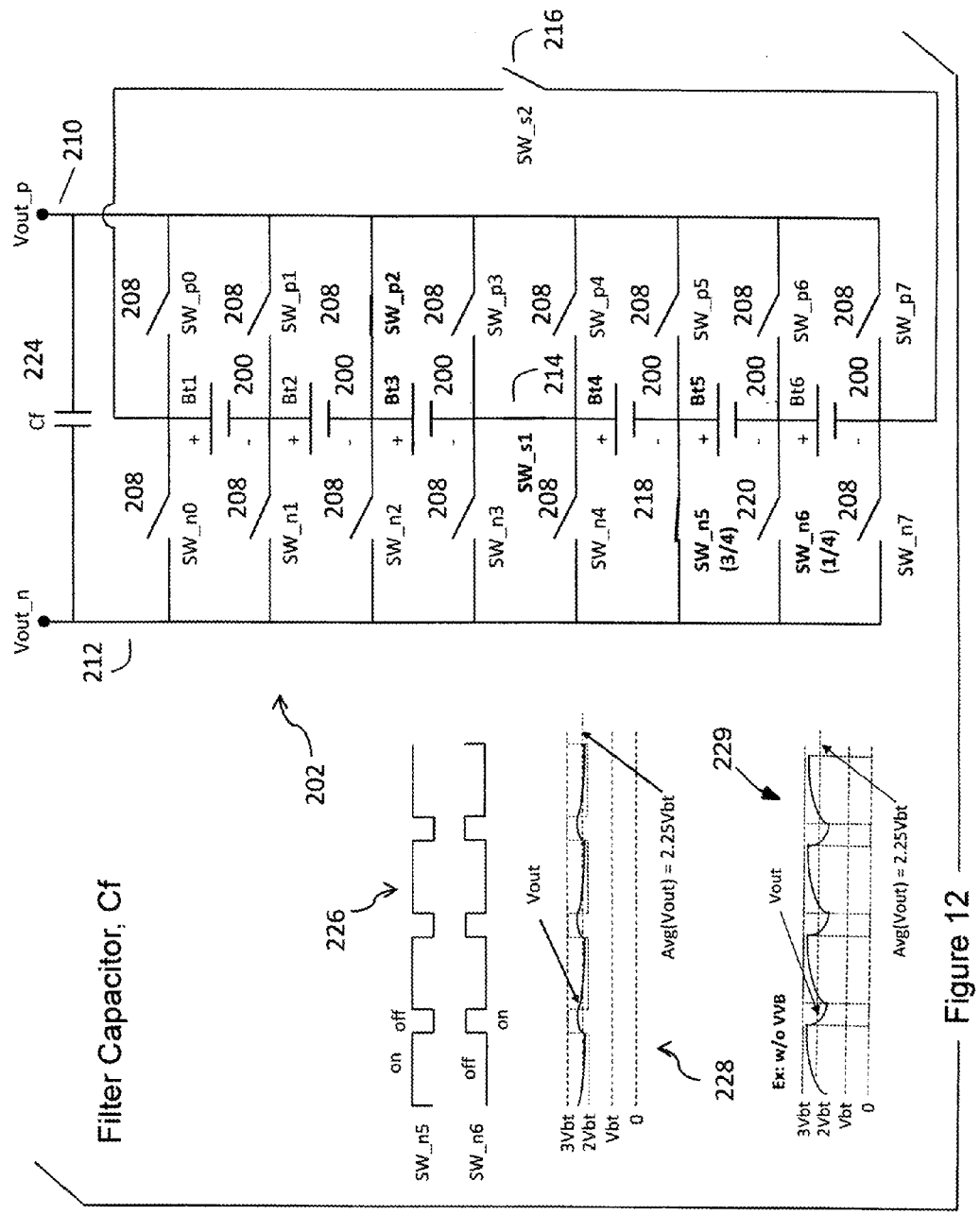
FIG. 12 shows an example embodiment of duty cycle modulation with capacitance filtering of a configured reconfigurable battery with two banks of battery cells in accordance with the present invention.

At least one capacitance filter 224, as shown in FIG. 12, may be added to the above described embodiments to smooth out the output voltage. In the example embodiment of the present invention, a single capacitor 224 is placed across the output voltage connections 210 and 212. The capacitor is connected in a circuit using duty cycle modulation as described in the preceding embodiment. A simulated digital pulse trace 226 and a simulated voltage trace 228 demonstrate the resulting smoothed waveform obtained by adding the filter to the variable voltage battery ("VVB") of the present invention. Depending on the switch type, switching method, and waveform filter used in this embodiment, switching rates can be reduced, possibly resulting in energy savings. Inductive filtering can be substituted for (or used in conjunction with) the capacitive filtering, e.g., by providing an inductor in series between the battery and the load. An illustrative voltage trace 229 illustrates, for comparison, the case where the variable voltage battery of the present invention is not used. Note the larger voltage swing between the on and off states without the VVB, as shown in simulated trace 229.

Figure 13:
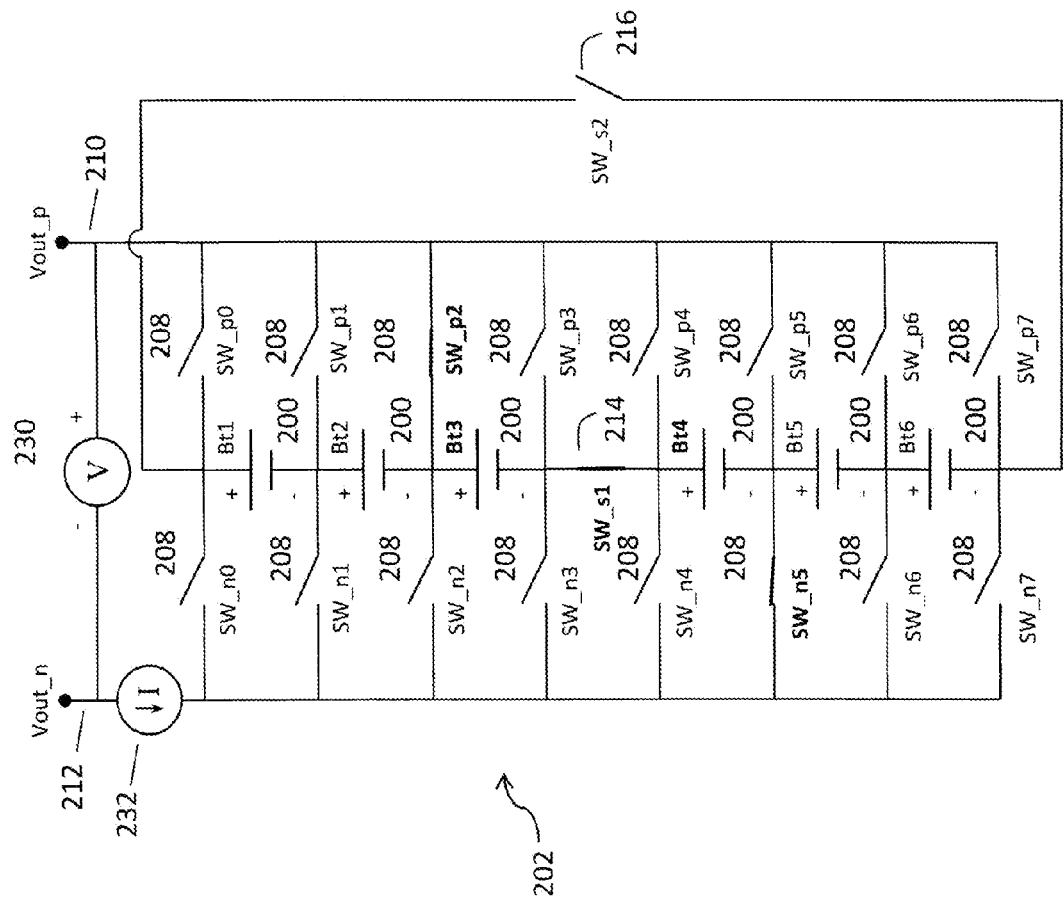
FIG. 13 shows an example embodiment of a configured reconfigurable battery with two banks of battery cells and voltage and current monitoring in accordance with the present invention.

The previously described embodiments may include voltage monitoring 230 and current monitoring 232 as shown in the example embodiment of a reconfigurable series connected plurality of battery cells in FIG. 13. Voltage and current monitoring systems and methods in combination with switching means 208 described herein, allow identification and status monitoring of battery cell 200 charge and discharge states.

The reconfigurable battery 202 described in the preceding embodiments used in combination with at least one electric motor 226 allows motor speed control by regulating battery output voltage based on the number of cells configured in series. Also, battery cell 200 recharge schemes may be customized by selectively configuring the number and relative position of series connected battery cells 200 that match motor 226 output voltage during regenerative braking and charging.

Figure 14:
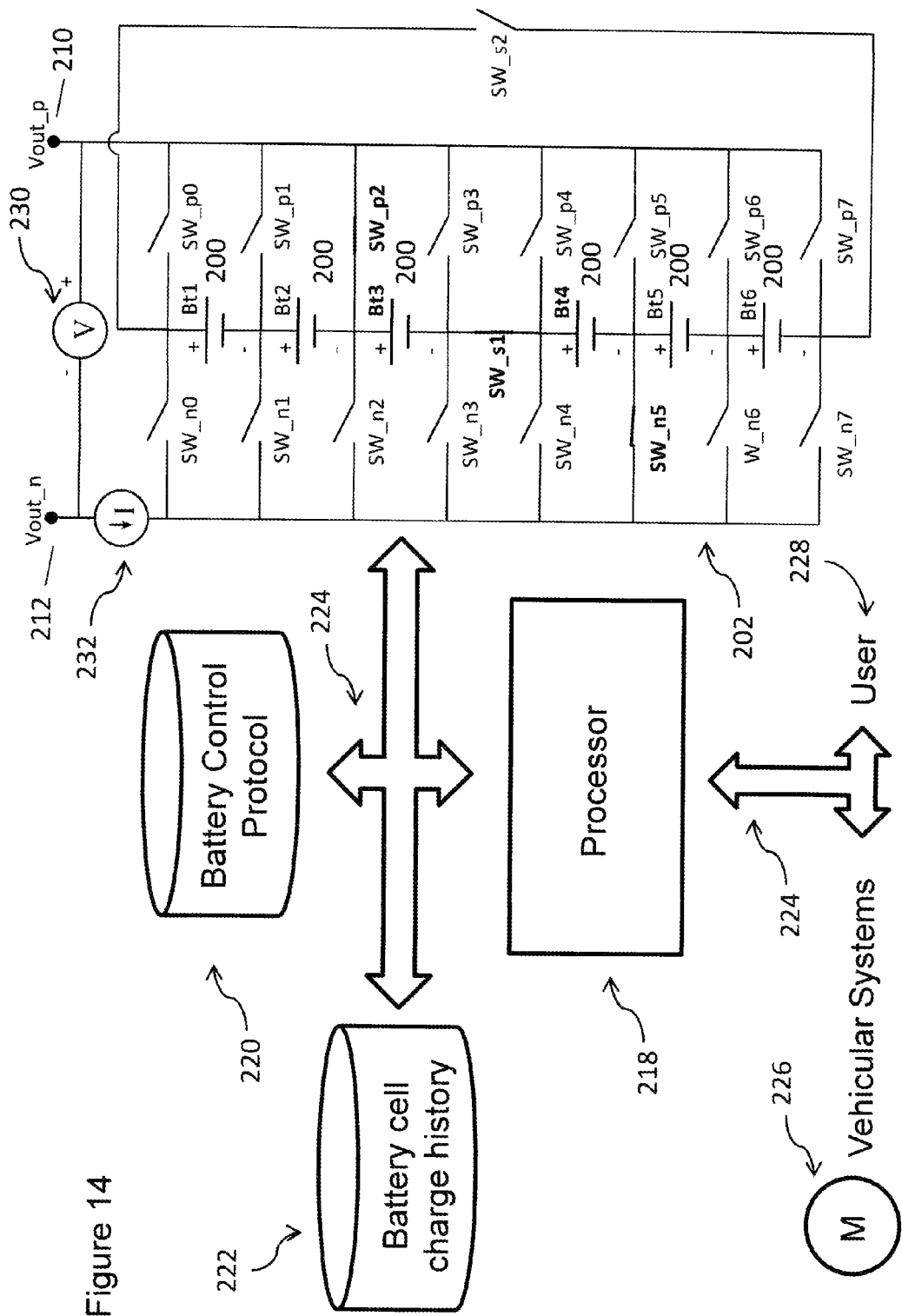
FIG. 14 shows an example embodiment of a configured reconfigurable battery and a switching control system in accordance with the present invention.

FIG. 14 shows a battery reconfiguration control system that can interface with vehicular systems (e.g. motors 226) and communicate with users 228 to control the reconfiguration of switches 208 to bypass weak or dead battery cells 200, short out dying cells 200 if necessary to regain current handling capacity, and balance battery cell 200 usage. An electronic processor 218 such as a microprocessor with associated primary and secondary memory 220 and 222, voltage 230 and current 232 sensors, and associated software can maintain charge/discharge history to help regulate battery cell life and provide load balancing during discharge and recharge states. Battery cell 200 temperature monitoring may also be included since battery duty cycle varies as a function of temperature. Such temperature monitoring is particularly useful for charge and discharge control, as well as for diagnosis of failing cells. Control signals may be exchanged between the sensors 230 and 232, the battery 202, motors 226, and processors 218 using dedicated communication pathways 224 or over power connections 210 and 212.

Powering the battery reconfiguration control system down and powering it up again requires following a predetermined protocol. Power down occurs, for example, when the reconfigurable battery 202 becomes discharged, and requires that all switching means 208 and 214 and 216 be placed in an inactive state (open) as shown in FIGS. 9a and 10a. Powering the system up again begins with activation of the processor 218, perhaps a microprocessor, followed by accessing configuration settings, status of the battery cells, past history and exception states from memory 220 and 222. If a charging cycle is begun, control logic analyzes the information received from memory 220 and 222 and configures switching means 208 to accomplish the task most effectively.

It is noted that measuring the average current flow can take time that may result in an undesirable amount of delay. An alternative is to calculate the current flow expected so that the resistance or the PWM duty cycle can be adjusted in synchrony with the reconfiguration of the battery, the motor, or both.

It should now be appreciated that the present invention provides advantageous methods and apparatus for reconfiguring a battery having a plurality of battery cells, reconfiguring an electric motor assembly, or a combination thereof.

In accordance with the invention, potential loss is avoided when full current output is needed by keeping the battery cells in a series connection without intervening switches within the series path. Moreover, by tapping at different points in the series connected batteries, the voltage output can be varied with only two switch losses being incurred. The output voltage of the battery can even be set to zero, and if desired (e.g., for emergency braking), the voltage polarity of the battery can be reversed. If all of the series battery cells are used (e.g., the bottom switch on one side and the top switch on the other side are closed), maximum output voltage is achieved. If less than the total number of cells is used, the voltage will be lower. With a battery structure according to the invention, there are many different combinations of switch closings for the same (lower) voltage output. These combinations can be selected in a time sequential manner to even out the drain on the cells without taxing any one cell too much, while maintaining a constant voltage output.

A key benefit of the inventive variable voltage battery is that it allows speed control and regenerative braking in a battery powered vehicle to be easily achieved. This is due to the fact that the battery voltage adapts to the needs of the motor when driving and to the voltage output of the motor during regenerative braking. For example, one of the two switches used to set the battery voltage can be modulated (e.g., using PWM) to provide the motor speed control. Alternatively, it is possible to modulate between two voltage output values to achieve a finer control of the average battery voltage output to the motor. In an all-or-nothing PWM speed control, the voltage to the motor instantly changes from its maximum value to zero when the switch is opened. In such a scenario, there will be a large voltage spike when the motor gets disconnected from the battery since the magnetic field in the motor must collapse. With the disclosed finer voltage control between two voltages, there is much less transient since the circuit is still closed with the battery.

The switching for "reconfiguration" of the battery and for modulation of the switches can occur at a very high rate, e.g., at KHz or even MHz frequencies if the switches (e.g. power MOSFETs) are turned on and off quickly. A lower switching rate, however, can potentially save a bit of power since large MOSFET transistors require more current as the switching rate increases. Thus, there is a tradeoff between switching speed and power requirements.

Moreover, since the voltage fluctuation during the switching operations in accordance with the invention can be as small as one battery cell voltage (e.g. 3.6V for Lithium Ion battery cells as compared to the 48V battery pack used in conventional small electric vehicles such as bicycles), the switching transients are smaller both in voltage, current, and torque. If a motor powered by a normal battery is controlled using PWM, there will usually be a large voltage spike whenever the PWM switch is open due to the inductive nature of the motor. In fact, when the switch is open a large voltage can develop causing a spark thereacross as the inductor tries to maintain the current flow. With the present invention, the provision of a variable voltage battery keeps the circuit from opening completely. The battery simply goes from one voltage to another, and part of the battery is always connected to the motor. This provides a continuous current path at all times, except when the voltage has to ramp down to zero. With the inventive VVB, even when the voltage is ramped down to zero a current path can be provided by properly reconfiguring the battery. Therefore, the VVB based operation of the present invention is much gentler, both for driving and for regenerative braking. Adding a filter capacitor as described hereinabove can help to some degree where a VVB is not used, but using the inventive VVB results in better performance for a given size capacitor.

The invention also provides significant advantages over designs using an inverter (e.g. DC to DC converter), as such inverters suffer from significant conversion losses and introduce complexities when trying to charge the battery in a regenerative braking mode.

The configurations of the present invention can also "short-out" (i.e., bypass) a dead or weak battery cell so that the entire battery does not suffer a failure due to a single bad cell. Even multiple bad cells can be bypassed and the battery pack will still perform well, albeit at a reduced maximum voltage. An algorithm can be used to sniff out a weak or bad cell that does not maintain reasonable voltage or current during discharge or misbehaves during re-charging. As will be appreciated by those skilled in the art, such a feature would require current and voltage sensors and a suitable controller. Another algorithm that can be provided in accordance with the invention is one that provides load balancing to keep all the battery cells evenly charged during re-charging or regenerative braking.

It should further be appreciated that the included embodiments describing a plurality of battery cells may also be interpreted as a plurality of battery banks or a plurality of batteries, without departing from the scope of the present invention. For example, each battery cell described herein may consist of two or more battery cells in a series or parallel connection.

Although the invention has been described in connection with various illustrated embodiments, numerous modifications and adaptations may be made thereto without departing from the spirit and scope of the invention as set forth in the claims.

What is claimed is:

1. A reconfigurable battery, comprising at least one bank of:
   a statically joined plurality of series connected battery cells;
   each of said battery cells comprising a first voltage pole and a second voltage pole;
   at least one processor controlled switch electrically connected between said first voltage pole of each of said battery cells and a first electrical output connection;

at least one processor controlled switch electrically connected between said second voltage pole of each of said battery cells and a second electrical output connection;

wherein said processor controlled switches are adapted to electrically reconfigure said battery cells by coupling a first voltage pole of one of said battery cells to said first electrical output connection and a second voltage pole of one of said battery cells to said second electrical output connection to provide a reconfigurable battery output voltage between said first and second electrical output connections.

2. The reconfigurable battery according to claim 1, wherein said reconfigurable battery output voltage is approximately equal to the voltage summation of the electrically reconfigured battery cells, and is in a range between zero volts and a maximum absolute output voltage for said statically joined plurality of series connected battery cells.

3. The reconfigurable battery according to claim 1 further comprising:
at least one switch electrically connected between said first voltage pole of a beginning battery cell in said statically joined plurality of series connected battery cells and said second electrical output connection.

4. The reconfigurable battery according to claim 1 further comprising:
at least one switch electrically connected between said second voltage pole of an end battery cell in said statically joined plurality of series connected battery cells and said first electrical output connection.

5. The reconfigurable battery according to claim 1 further comprising a plurality of banks of said statically joined plurality of series connected battery cells connected in a parallel configuration.

6. The reconfigurable battery according to claim 1, wherein a series joining of a first bank of said statically joined plurality of series connected battery cells to a second bank of said statically joined plurality of series connected battery cells comprises:
a first intermediate processor controlled switch connected between a second voltage pole of an end positioned battery cell in a first bank and a first voltage pole of a beginning positioned battery cell in a second bank;
a second intermediate processor controlled switch connected between a first voltage pole of a beginning positioned battery cell in a first bank and a second voltage pole of an end positioned battery cell in a second bank;
connection of said first electrical output connection of said first bank to said first electrical output connection of said second bank; and
connection of said second electrical output connection of said first bank to said second electrical output connection of said second bank;
wherein said first intermediate processor controlled switch and said second intermediate processor controlled switch cannot simultaneously be in a closed state.

7. The reconfigurable battery according to claim 6, wherein said second bank comprising a statically joined plurality of series connected battery cells is substituted by a single battery cell.

8. The reconfigurable battery according to claim 1, further comprising at least one of an inductive or a capacitive element for at least one of voltage and current waveform filtering.

9. The reconfigurable battery according to claim 1, further comprising a voltage monitoring means and a current monitoring means.

10. The reconfigurable battery according to claim 9, wherein said voltage and current monitoring means comprise a battery cell condition control system.

11. The reconfigurable battery according to claim 10, wherein said battery cell condition control system comprises at least one electronic processor, at least one data storage device, at least one communication channel, at least one reconfigurable battery control protocol, and a user interface protocol.

12. The reconfigurable battery according to claim 6, wherein said switches and said intermediate switches comprise at least one of solid state and mechanical switches.

13. The reconfigurable battery according to claim 1, wherein said first voltage pole is at a higher voltage potential than said second voltage pole.

14. The reconfigurable battery according to claim 1, wherein said battery provides energy for an electrical load comprising a vehicle with at least one electrical motor.

15. The reconfigurable battery according to claim 14, wherein said vehicle is one of an electric bicycle, an electric scooter, an electric vehicle, a hybrid automobile, a hybrid truck, an electric powered wheelchair, and an electric powered golf cart.

16. The reconfigurable battery according to claim 1, wherein:
said battery is charged by connecting at least one power source to said battery, and
said power source is a vehicle electrical system adapted for regenerative charging.

17. A method for reconfiguring a battery comprising:
arranging a portion of a statically joined plurality of series connected battery cells into a first configuration adapted to provide a first battery voltage; and
reconfiguring at least a portion of said statically joined plurality of series connected battery cells into a second configuration adapted to provide a second battery voltage;
wherein said reconfiguring comprises:
closing a first processor controlled switch to electrically couple a first voltage pole of a battery cell in said statically joined plurality of series connected battery cells to a first electrical output connection; and
closing a second processor controlled switch to electrically couple a second voltage pole of a battery cell in said statically joined plurality of series connected battery cells to a second electrical output connection.

18. A method in accordance with claim 17, wherein said reconfiguring for a series joined first bank of said statically joined plurality of series connected battery cells to a second bank of said statically joined plurality of series connected battery cells comprises alternatively closing:
a) a first intermediate processor controlled switch connected between a second voltage pole of an end positioned battery cell in said first bank and a first voltage pole of a beginning positioned battery cell in said second bank, or
b) a second intermediate processor controlled switch connected between a first voltage pole of a beginning positioned battery cell in said first bank and a second voltage pole of an end positioned battery cell in said second bank.

19. A method in accordance with claim 18, wherein said processor controlled switches comprise one of pulse width modulation processor controlled switches or pulse density modulation processor controlled switches.

20. A method in accordance with claim 18, wherein said first voltage pole is at a higher voltage potential than said second voltage pole.

21. A method in accordance with claim 18, wherein said second processor controlled switch comprises alternatively switching by pulse width modulation switching or pulse density modulation switching between a first configuration of series connected battery cells exhibiting a first voltage and a second configuration of series connected battery cells exhibiting a second voltage to produce an intermediate output voltage.

22. A method in accordance with claim 18, wherein said reconfigurable battery is alternatively configured to provide energy to at least one electrical load or to receive energy for recharging.

23. A method in accordance with claim 22, wherein said electrical load comprises a vehicle with at least one electrical motor.

24. A method in accordance with claim 23, wherein:
said reconfigurable battery is recharged by connecting at least one power source to said battery; and
said power source provides regenerative charging via a vehicle braking action that activates at least one electric motor, inducing current flow to said battery.

25. A method in accordance with claim 18, further comprising:
monitoring voltage and current of battery power discharge;
monitoring voltage and current of battery power charge; and
controlling said reconfiguring based on said monitoring.

26. A method in accordance with claim 25, further comprising:
providing an auxiliary power source for said monitoring, for said controlling, and for said reconfiguring of a plurality of series connected battery cells.

27. A method in accordance with claim 18, further comprising:
monitoring temperature of said battery cells; and
controlling said reconfiguring based on said monitoring.

28. A method in accordance with claim 17, wherein said processor controlled switches comprise one of pulse width modulation processor controlled switches or pulse density modulation processor controlled switches.

29. A method in accordance with claim 17, wherein said first voltage pole is at a higher voltage potential than said second voltage pole.

30. A method in accordance with claim 17, wherein said second processor controlled switch comprises alternatively switching by pulse width modulation switching or pulse density modulation switching between a first configuration of series connected battery cells exhibiting a first voltage and a second configuration of series connected battery cells exhibiting a second voltage to produce an intermediate output voltage.

31. A method in accordance with claim 17, wherein said reconfigurable battery is alternatively configured to provide energy to at least one electrical load or to receive energy for recharging.

32. A method in accordance with claim 31, wherein said electrical load comprises a vehicle with at least one electrical motor.

33. A method in accordance with claim 32, wherein:
said reconfigurable battery is recharged by connecting at least one power source to said battery; and
said power source provides regenerative charging via a vehicle braking action that activates at least one electric motor, inducing current flow to said battery.

34. A method in accordance with claim 17, further comprising:
monitoring voltage and current of battery power discharge;
monitoring voltage and current of battery power charge; and
controlling said reconfiguring based on said monitoring.

35. A method in accordance with claim 34, further comprising:
providing an auxiliary power source for said monitoring, for said controlling, and for said reconfiguring of a plurality of series connected battery cells.

36. A method in accordance with claim 17, further comprising:
monitoring temperature of said battery cells; and
controlling said reconfiguring based on said monitoring.

* * * * *